United States Patent
Sutha et al.

(10) Patent No.: US 6,298,162 B1
(45) Date of Patent: Oct. 2, 2001

(54) IMAGE COMPRESSION/EXPANSION USING PARALLEL DECOMPOSITION/RECOMPOSITION

(75) Inventors: Surachai Sutha; Dan T. Long, both of Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 08/391,263

(22) Filed: Feb. 21, 1995

Related U.S. Application Data

(63) Continuation of application No. 07/995,696, filed on Dec. 23, 1992, now abandoned.

(51) Int. Cl.$^7$ .............................................. G06K 9/36
(52) U.S. Cl. ................................. 382/234; 382/240
(58) Field of Search ...................... 395/375; 358/426; 382/232, 233, 234, 240

(56) References Cited

U.S. PATENT DOCUMENTS

| | | | |
|---|---|---|---|
| 4,075,630 | 2/1978 | Shapiro et al. ................. 342/196 |
| 4,621,339 | 11/1986 | Wagner et al. ................... 712/22 |
| 4,739,474 | 4/1988 | Holsztynski ..................... 712/14 |
| 4,783,738 | 11/1988 | Li et al. ........................ 712/21 |
| 4,797,729 | * 1/1989 | Tsai ......................... 375/240.25 |
| 4,811,210 | 3/1989 | McAulay ....................... 710/132 |
| 4,825,359 | 4/1989 | Ohkami et al. ................... 712/15 |
| 4,845,767 | * 7/1989 | Mori et al. ..................... 382/282 |
| 4,873,626 | 10/1989 | Gifford ......................... 710/120 |
| 4,891,787 | 1/1990 | Gifford ......................... 712/205 |
| 4,920,480 | 4/1990 | Murakami et al. ................ 712/36 |
| 4,955,024 | 9/1990 | Pfeiffer et al. ................. 714/763 |
| 4,972,495 | 11/1990 | Blike et al. .................... 382/304 |
| 4,979,136 | 12/1990 | Weiman et al. .................. 382/169 |
| 4,985,832 | 1/1991 | Grondalski ...................... 712/22 |
| 4,985,848 | 1/1991 | Pfeiffer et al. ................. 345/505 |
| 5,050,065 | 9/1991 | Dartois et al. .................. 702/57 |
| 5,058,001 | 10/1991 | Li .............................. 703/23 |
| 5,083,265 | 1/1992 | Valiant ......................... 712/21 |
| 5,086,489 | * 2/1992 | Shimura ....................... 382/238 |
| 5,095,527 | 3/1992 | Uramoto et al. ................. 712/14 |
| 5,119,323 | * 6/1992 | Nickerson et al. ............... 708/446 |
| 5,172,237 | * 12/1992 | Blonstein et al. ............. 358/261.3 |
| 5,267,051 | * 11/1993 | Dellert et al. ................. 358/426 |
| 5,327,254 | * 7/1994 | Daher et al. ................... 358/426 |
| 5,379,351 | * 1/1995 | Fandrianto et al. .............. 382/236 |
| 5,506,916 | * 4/1996 | Nishihara et al. ............... 382/232 |

OTHER PUBLICATIONS

Timothy A. Adams et al., "The Manipulation of RasterBased Topgraphic Data on a Parallel Processor", *Proceedings of IEEE Computer Society Conference on Pattern Recognition and Image Processing*, PRIP–82, pp. 396–404, 1982.

Rafael C. Gonzalez et al., *Digital Image Processing*, Addison–Wesley Publishing Co., 1992.

* cited by examiner

*Primary Examiner*—Kenneth R. Coulter
(74) *Attorney, Agent, or Firm*—Burns, Doane, Swecker & Mathis, LLP

(57) ABSTRACT

A fast method with logarithmic complexity for image compression and expansion is provided, implementable on the Geometric Arithmetic Parallel Processor (GAPP) or any similar fine-grained, mesh-connected Single Instruction-Multiple Datastream (SIMD) array processor. Efficient decomposition of the original image into multiple subimages enables the method to exploit the parallelism of the SIMD computer for implementing powerful multiresolution pyramid and hierarchical image processing techniques on a massively parallel processor.

10 Claims, 17 Drawing Sheets

FIG. 12
(PRIOR ART)

IMAGE COMPRESSION/EXPANSION USING PARALLEL DECOMPOSITION/RECOMPOSITION

This application is a continuation, of application Ser. No. 07/995,696, filed Dec. 23. 1992, now abandoned.

BACKGROUND

The present invention pertains to implementation of a method for fast image compression and expansion in a Single Instruction-Multiple Datastream (SIMD) array processor, and provides real-time spatial resolution image compression and expansion processing.

Spatial resolution compression and expansion are necessary in multiresolution image processing. Existing methods for image compression and expansion require too many instructions, and may not be suitable for certain types of real-time applications.

For the purpose of this discussion, the terms compression and expansion have the following meanings. Compression means sub-sampling or reducing the spatial resolution of the given image by a factor K, where K is some small positive integer. It is equivalent to low-pass filtering. Expansion means magnifying or increasing the size of the given image by a factor K. For convenience, the methods will be explained using an example with K=2. Let I(m,n) be the original image containing 2M×2N pixels, where m=1, 2, . . . , 2M; n=1, 2, . . . 2N; M and N are positive integers. The compression of I(m,n) by a factor of 2 in both dimensions of the image yields $$C(j,k)=I(2j,2k)$$

where C(j,k) is the compressed image; j=1, 2, . . . , M; and k=1, 2, . . . , N. Some applications may require local averaging to be performed on I(m,n) prior to the compression.

There are varying methods for achieving expansion or compression. One type of method is a sequential method; another is a parallel method such as can be implemented on a parallel processor. The complexity of a sequential method may be expressed as O(M×N), on the order of magnitude of M×N or proportional to M×N. The sequential method involves the copying of M×N selected pixels, one pixel at a time, from I(2j,2k) to C(j,k). Using a parallel method, however, image compression is performed in two stages; first, with respect to rows, and then with respect to columns. To compress the rows, image I(2j,2k) is shifted until row 2j of image I(2j,2k) aligns with row j of compressed image C(j,k) before all pixels in row 2j are copied simultaneously into compressed image C(j,k), as shown in FIGS. 12(a)–(q) for M=16. After all selected M rows are copied, a similar process is applied to the columns. The complexity of such a parallel method may thus be expressed as O(M+N). The total number of GAPP instructions (clock cycles) required by this method for compressing a 108×384 pixel image, 8 bits per pixel, down to a 54×192 pixel image, 8 bits per pixel, is 20,316.

General mathematical properties of image compression and other digital image processing techniques are presented, for example, in *Digital Image Processing* (Addison-Wesley, 1992) by R. Gonzalez and R. Woods, and in "The Manipulation of Raster-based Topographic Data on a Parallel Processor," *Proceedings of IEEE Computer Society Conference on Pattern Recognition and Image Processing, PRIP-82*, pp. 396–404, by T. A. Adams and K. A. Smith.

The parallel method is an example of certain data processing tasks that require that substantially identical logical or arithmetical operations be performed on large amounts of data. One approach to carrying out such tasks which is drawing increasing attention is massively parallel processing. In parallel processing, each element or cell of an array processor made up of such cells processes its own bit of data at the same time as all other cells of the array processor perform the same process on their own bit of data. Such machines are referred to by several names, including Single Instruction-Multiple Datastream (SIMD), and massively parallel array processors.

A common arrangement for such a machine is as a rectangular array of cells, with each interior cell connected to its four nearest neighboring cells and each edge cell connected to a data input/output device. Each cell is connected as well to a master controller which coordinates the movement of data through the array by providing appropriate instructions to the processing elements. When used in high resolution image processing, such processors handle the image pixels as a data matrix which can be loaded into and processed quickly and efficiently by the processor array.

Although based upon the same generic concept of an array of cells all performing the same function in unison, parallel processors vary in details of cell interconnection and design. For example, U.S. Pat. No. 4,215,401 to Holsztynski et al. discloses a cell which includes a random access memory (RAM), a single bit accumulator, and a simple logical gate. The disclosed cell is extremely simple and, hence, inexpensive and easily fabricated. A negative consequence of this simplicity, however, is that some complex computational operations are quite cumbersome so that it may require many basic operations (instructions) to perform a complex task.

U.S. Pat. No. 4,739,474, to Holsztynski et al., represents a higher level of cell complexity, in which the logic gate is replaced by a full adder capable of performing both arithmetic and logical functions. Pressing the full adder into dual service creates an efficiency which more than offsets the added complexity and cost incurred by including a full adder in each cell.

Parallel processors may also vary in the manner of cell interconnection. As mentioned above, cells are typically connected to their nearest physical neighbors. All cells except those at the edge of the entire array are connected to four neighbors. Significant benefits may, however, flow from providing for alternate paths of interconnection and, specifically, in providing programmable, flexible interconnection between cells.

SUMMARY

A fast method with logarithmic complexity for image compression and expansion is provided, implementable on a fine-grained, mesh-connected Single Instruction-Multiple Datastream (SIMD) array processor such as Martin Marietta's Geometric Arithmetic Parallel Processor (GAPP). Efficient decomposition of the original image into multiple subimages exploits the parallelism of the SIMD computer for implementing powerful multiresolution pyramid and hierarchical image processing techniques.

While the complexity (execution time) of known parallel methods is O(M+N), the complexity of the new fast parallel method of the present invention may be expressed as O($\log_2$(M+1)+$\log_2$(N+1)), where the size of the original image is 2M×2N. The compression and expansion (for post-processing) of a 108×384×8-bit image requires about forty thousand GAPP instructions using the previously known method. The new method of the present invention requires only about eleven thousand instructions, in one exemplary embodiment.

The fast image compression and expansion implementations of the present invention are suitable for a parallel data processor comprised of an array of identical cells concurrently performing identical operations under the direction of a central controller, and incorporating one or more special cell architectures such as a segmented memory, conditional logic for preliminary processing, circuitry for indicating when the cell is active, and programmable cell interconnection including cell bypass and alternate connection of edge cells. The fast image compression and expansion implementations of the present invention are also suitable for a single instruction-multiple datastream (SIMD) systolic array processor having provision for local address generation, direct access to external devices, and programmable cell interconnectivity for providing great versatility while at the same time retaining the advantages of the SIMD architecture.

Applications include use of the fast image compression and expansion methods of the present invention for compressing and/or expanding optical images in both one and two dimensions. Results to date demonstrate compression superior (several times faster) to previously attempted compression methods. The improvement in compression (or expansion) speed will increase with the size of the original image.

In one aspect, the present invention provides a device and method for transforming a first representation of an information pattern, where the first representation is characterized by a first size, into a second representation of the information pattern, where the second representation is characterized by a second size different from the first size. The exemplary device and method include a first process for parallel aggregation of irreducible quantized elements (for example, pixel values) of the first representation into first aggregates, where each first aggregate includes more than one irreducible quantized element. The exemplary device and method further include a second process for parallel aggregation of the first aggregates into second aggregates, where each second aggregate includes more than one first aggregate.

In another aspect, the present invention provides a method for scaling a digital representation of an image, where the image is divided into M rows and N columns of P picture elements, M and N are positive integers, and P is the product of M and N. The digital representation includes P digital values each respectively indicative of a characteristic of an associated one of the P picture elements. The scaled digital representation of the image includes Q digital values, where Q is the product of P and a scaling factor L. The method includes loading the digital representation into a processor including an array of at least M rows and N columns of processing elements so that each of the processing elements stores an associated one of the P digital values. The method further includes controlling at least two pairs of rows of processing elements, where paired rows are separated by S rows, where S is related to L, to operate in parallel, at least one row of each pair being one of the M rows, and controlling at least two pairs of columns of processing elements, where paired columns are separated by S columns, to operate in parallel, at least one column of each pair being one of the N columns.

In yet another aspect, the present invention provides a device for transforming a first representation of an information pattern, where the first representation is characterized by a first size, into a second representation of the information pattern, where the second representation is characterized by a second size different from the first size. The device includes a first mechanism for parallel aggregation of irreducible quantized elements of the first representation into first aggregates, where each first aggregate includes more than one irreducible quantized element. The device further includes a second mechanism for parallel aggregation of the first aggregates into second aggregates, where each second aggregate includes more than one first aggregate. The first and second mechanisms for parallel aggregation further include a parallel data processor having a plurality of substantially identical cells for processing digital data signals. The parallel data processor further includes a controller for generating control signals in response to program instructions, and a plurality of substantially identical interconnected cells each including a full adder having two data input terminals, a carry input terminal, a sum output terminal, and a carry output terminal, and a plurality of memories connected to the full adder and the controller. The memories are each individually controllable to supply selected ones of a plurality of predetermined data signals to the input terminals of the full adder in response to control signals from the controller. The memories are connected to the full adder and the controller in such a way that both logical and arithmetic operations are performed by the full adder.

Alternatively, an exemplary parallel data processor includes a controller for generating control signals, and a plurality of identical cells. Each of the identical cells is connected to at least one neighboring cell and is responsive to the controller, and is adapted to process data from at least one neighboring cell in accordance with the control signals. Each cell includes a memory segmented into at least two blocks to be able to perform more than one read/write operation per clock cycle at the direction of the controller. Alternatively, another exemplary parallel data processor includes a controller for generating control signals, and a plurality of identical cells. Each of the identical cells is connected to at least one neighboring cell and is responsive to the controller, and is adapted to process data from at least one neighboring cell in accordance with the control signals. Each cell includes a memory having at least two ports to be able to perform more than one read/write operation per clock cycle at the direction of the controller.

BRIEF DESCRIPTION OF THE DRAWINGS

The foregoing and other features of the present invention will become apparent to one of ordinary skill in the art to which the invention pertains from the following detailed description when read in conjunction with the drawings, in which:

FIGS. 12(a)–(q) illustrate a known parallel method for image compression, showing row compression;

DETAILED DESCRIPTION OF PREFERRED EMBODIMENTS

The fast image compression and expansion processing of the present invention can be implemented most advantageously in a single instruction-multiple datastream (SIMD) machine such as the Geometric Arithmetic Parallel Processor (GAPP) described in commonly assigned U.S. Patent application Ser. No. 07/254,718. The GAPP is a fine-grained, mesh-connected computer, wherein each processor element is a 1-bit serial arithmetic logic unit (ALU) with 128 bits of random access memory (RAM). Before describing the fast image compression and/or expansion processing of the present invention, several embodiments of SIMD array processors are described that are useful for implementing the present invention.

Exemplary SIMD Array Processors for Image Compression

General details concerning the arrangement of parallel processors as an array of identical cells in the Geometric-Artihmetic Parallel Processor (GAPP) are available from aforementioned U.S. Pat. No. 4,739,474 to Holsztynski et al., hereinafter the "Holsztynski patent", the specification of which is incorporated here by reference. More specific details concerning arrangements of parallel processors as arrays of identical cells that are particularly useful for implementing the present invention are disclosed in the following co-pending patent application and issued patents (all assigned to the present assignee): U.S. Ser. No. 07/254, 718, filed Oct. 7, 1988, directed to a GAPP; U.S. Patent No. 5,179,714 to Robert B. Graybill, hereinafter the "Graybill patent", directed to an Advanced Systolic Array Processor (ASAP); and U.S. Patent No. 5,173,947 to Chandé et al., hereinafter the "Chandé patent", directed to a conformal image processor. The specifications of the Graybill and Chandé patents are incorporated here by reference. Features of these systems which make them especially useful include their north, south, east, and west connectivity (with wrap-around capability), and the capability for internal arithmetic and logic operations. Additionally, ASAP systems are endowed with extensive internal memory for each cell, and, like the later GAPP systems, the capability within each cell for local address generation. The present invention will therefore be described as it would be implemented in these systems. Advantages in the processing speed that fast image compression and expansion methods implemented on massively parallel SIMD array processors have over prior methods increase with the size of the image to be compressed or expanded. A GAPP with a higher density of processors per chip than other known processor chips is particularly suitable for implementing a large array for a large image size. It will be understood by one having ordinary skill in the art, however, that the invention could also be implemented in other systems.

Figure 1:
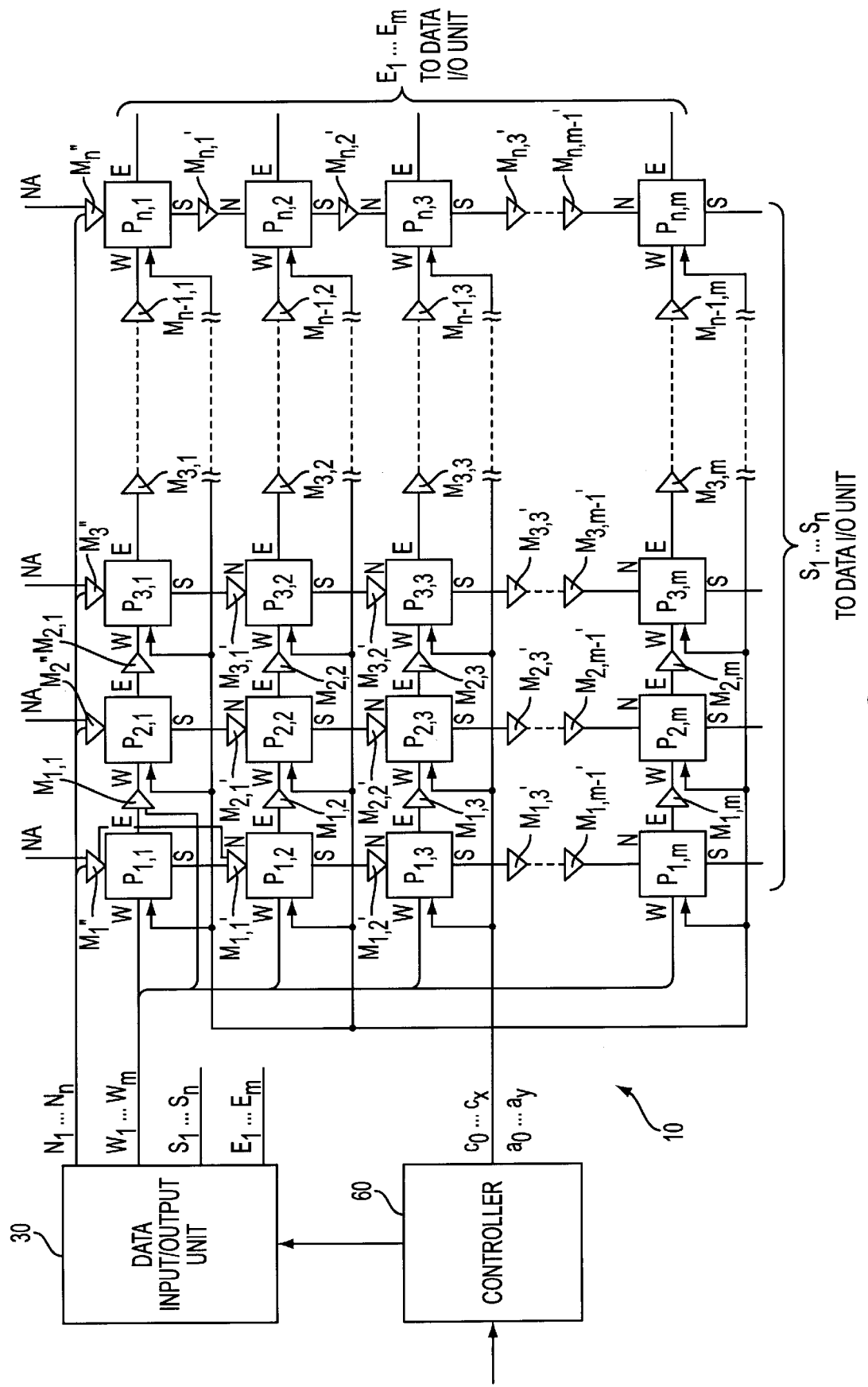
FIG. 1 is a block diagram of a preferred embodiment of a processor array useful for implementing the present invention.

As shown in the Holsztynski patent and in FIG. 1 herein, an array 10 may comprise n rows and m columns of identical processors or cells $P_{1,1}$ through $P_{n,m}$ to form an n×m rectangular network or matrix (the subscripts "n" and "m" representing variables which may assume any positive integral value). There are thus cells having four nearest neighbors (interior cells) and cells having less than four nearest neighbors (edge cells). For uniform orientation, the directions north, south, east, and west are used to reference up, down, right, and left, respectively, in the drawing, so that the nearest neighbors will be referred to as N, S, E, and W, respectively.

The edge cells of the array 10 are connected to a data input/output unit 30 as illustrated. Every cell receives command signals $C_0$–$C_x$ and address signals $a_0$–$a_y$ from a controller 60. In addition, clock signals may be provided by the controller 60 to each cell, and the data input/output unit 30 may also be controlled by the controller 60.

FIG. 1 also shows two multiplexer networks intermeshed with the cell array. The first multiplexer network is made up of multiplexers $M_{1,1}$ through $M_{n,m}$ and $M_{1,1}'$ through $M_{n,m}'$ ("n" and "m" here and elsewhere assuming values not necessarily related to those assumed in connection with labelling the cells unless otherwise specified). As will be developed below, this network is used for selective bypass of cells on an individual, row, column, or block basis.

The second multiplexer network is made up of multiplexers $M_1''$ through $M_n''$, and is used for selectively altering the connection of the north edge cells to either the data input/output unit 30 or to another cell in the array. An array may be made up of several interlinked chips, each supplying its own section or subarray of the main array. The second multiplexer network provides a capability of changing the virtual configuration of the array.

All of the multiplexers are responsive to the controller 60 through connections which have been omitted for clarity. It should be noted that the communication paths provided by the multiplexers are bidirectional, so that the multiplexers should be regarded as multiplexer/demultiplexers. It should also be noted that the term multiplexer is used herein generically to encompass any device for performing the functions ascribed to these elements, i.e., line selection based on a control input. Thus, simple switches may be multiplexers to the extent they are provided to perform such a function.

Figure 2:
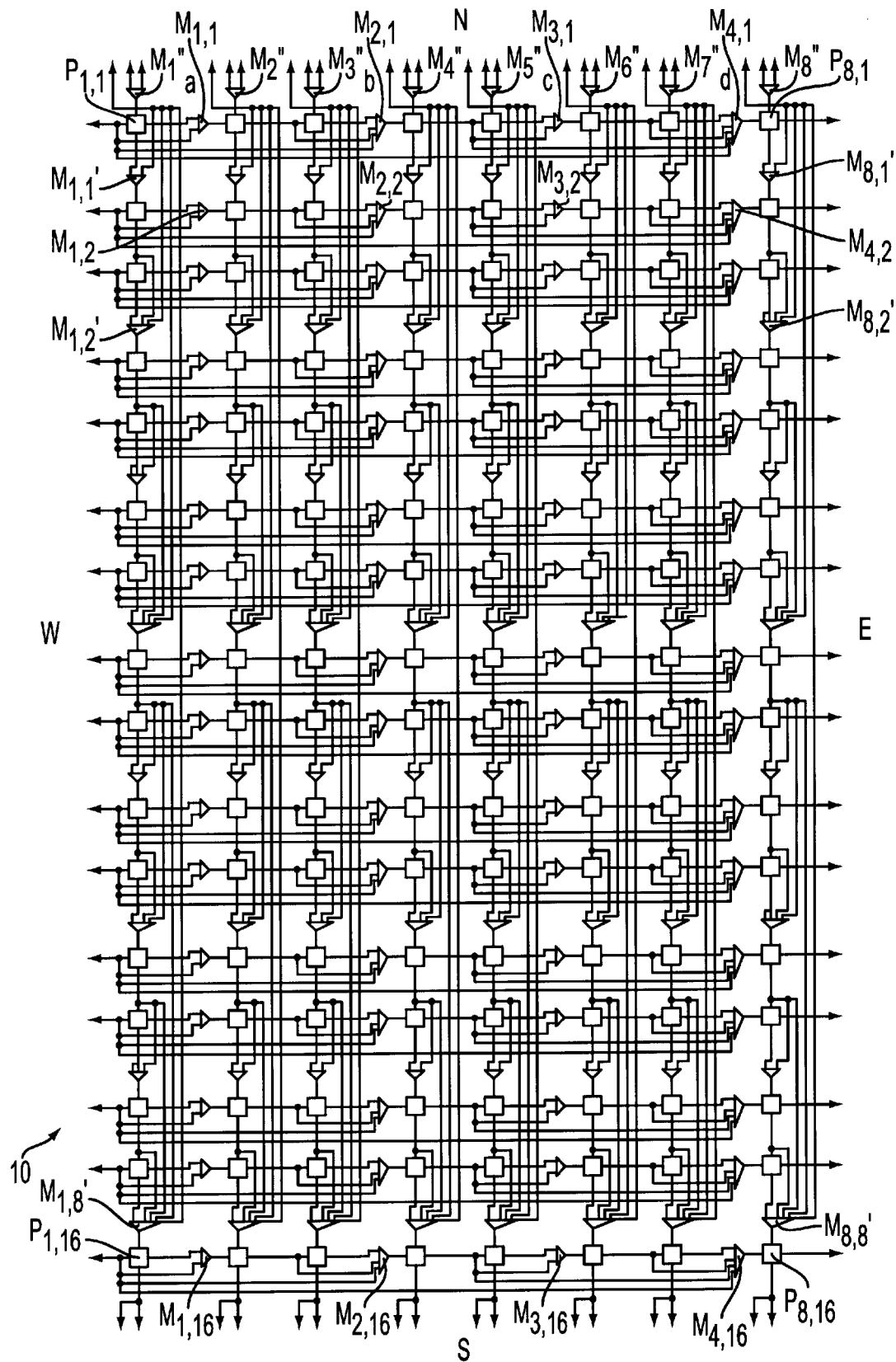
FIG. 2 is a schematic diagram of a second preferred embodiment of a processor array useful for implementing the present invention.

FIG. 2 is a more detailed rendering of an array 10 useful for implementing the present invention, in this case an 8×16 array of 128 identical cells $P_{1,1}$–$P_{8,6}$. Peripheral equipment such as controller 60 and connections thereto have been omitted for clarity, but it will be understood that such connections are present. FIG. 2 shows a first multiplexer bypass network with members arranged between selected cells thus bypassing intervening cells. The first multiplexer network is made up of multiplexers $M_{1,1}$ through $M_{4,16}$ and $M_{1,1}'$ through $M_{8,8}'$. As can be seen, it is not necessary that there be a multiplexer between every cell and its nearest neighbors in order to bypass entire rows, columns, or blocks and so, in effect, alter the virtual dimensions of the array to suit a particular application. As shown, there is one set of eight multiplexers per column and one set of four per row. Thus, in general, it is necessary only to have half as many multiplexers as cells in any row or column. Of course, if there is an alternate communication path, it may be desirable to provide that path with a multiplexer network as well.

When cell bypass is invoked, cell-to-cell communication is based on the value of a latched bypass control word which continuously drives the row and column multiplexer select lines. If it were desired to bypass the first column, for example, the westernmost I/O pins become logically connected to the west port of the cells in the second column.

Row and column bypass can be separately controlled so that all possible virtual array sizes, such as 7×12, 4×10, 1×16, or even 1×1, can be obtained. The array shown in FIG. 2, however, is designed so that it is not possible to bypass the array 10 entirely. The cells in the easternmost column are always connected to the east I/O pins so that data must always pass through the easternmost column of cells. Similarly, the cells in the southernmost row are always connected to the south I/O pins so that data must always pass through the southernmost row of cells. There is therefore a minimum 1×1 configuration.

The benefits of the cell bypass network are well exemplified in operations such as parallel data summation, also known as an array sum. An array sum is a summation of the same data type variable in each cell throughout the entire array. With programmable bypass, this summation may be achieved using the following method:

(1) program the cell bypass network to full 8×16 configuration;

(2) command each cell to shift its variable to its eastern neighbor;

(3) command each cell to add the received variable to its resident value (which results in cells in columns 2, 4, 6, and 8 containing a non-overlapping set of sums);

(4) program the cell bypass network to a 4×16 configuration logically interconnecting columns 2, 4, 6, and 8;

(5) repeat steps (2) and (3) (which results in cells in columns 4 and 8 containing a non-overlapping set of sums);

(6) program the cell bypass network to a 2×16 configuration logically interconnecting cells in column 4 to cells in column 8;

(7) repeat step 5 (which results in cells in column 8 containing the sums for the entire array from west to east); and (8) repeat the method north to south to sum cells in column 8, halving the row configuration after each shift and add until the entire array sum resides in the cell at the southeastern corner of the array.

Without the cell bypass network, many additional clock cycles would be required to shift the data through the non-participating cells to the ultimate destination when performing the partial array summations. The cell bypass network allows direct cell communication for a minimal overhead of 2 cycles for array reconfiguration.

Figure 3A:
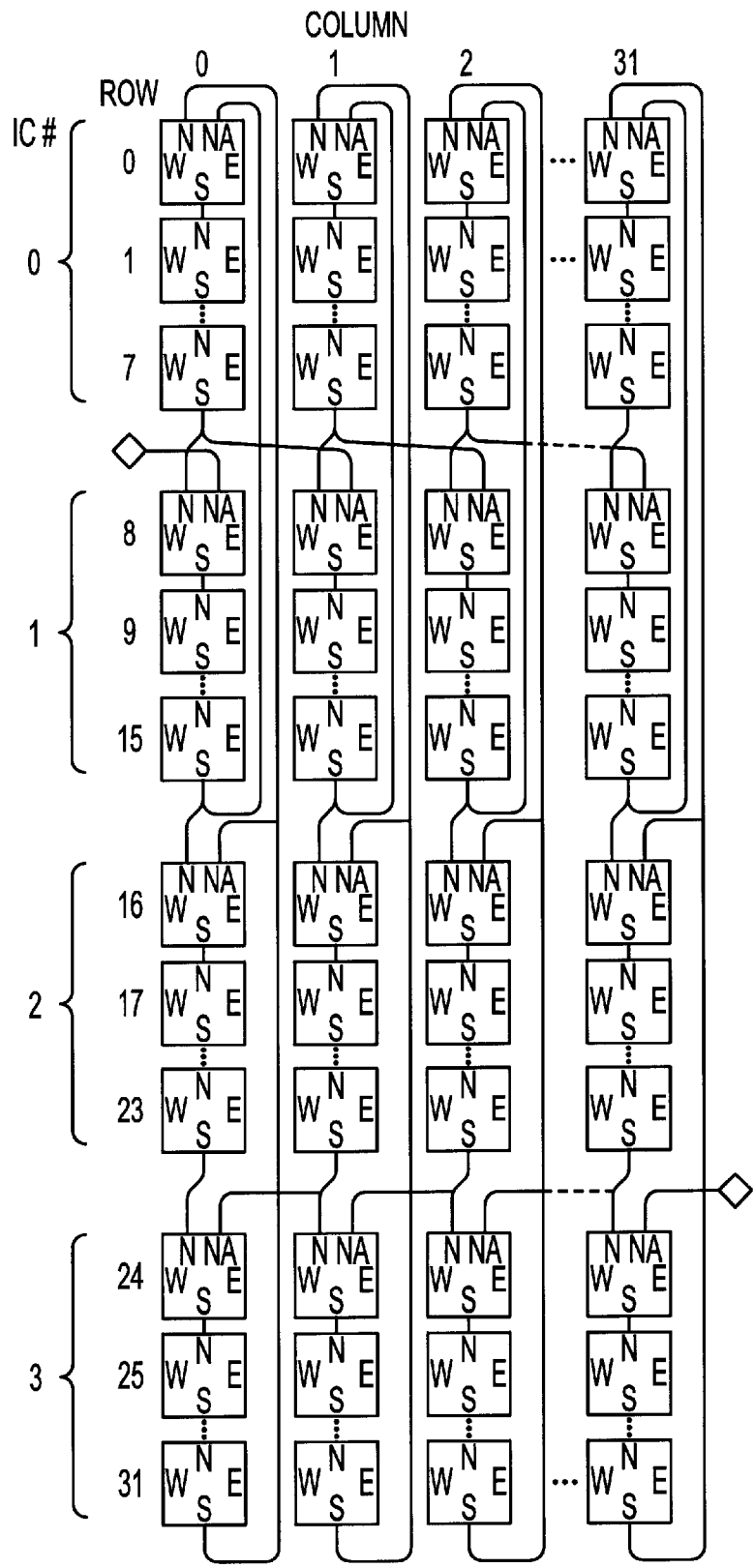
FIGS. 3(a), 3(b), and 3(c) are block diagrams showing alternate array interconnections useful for implementing a preferred embodiment of the invention.
Figure 3B:
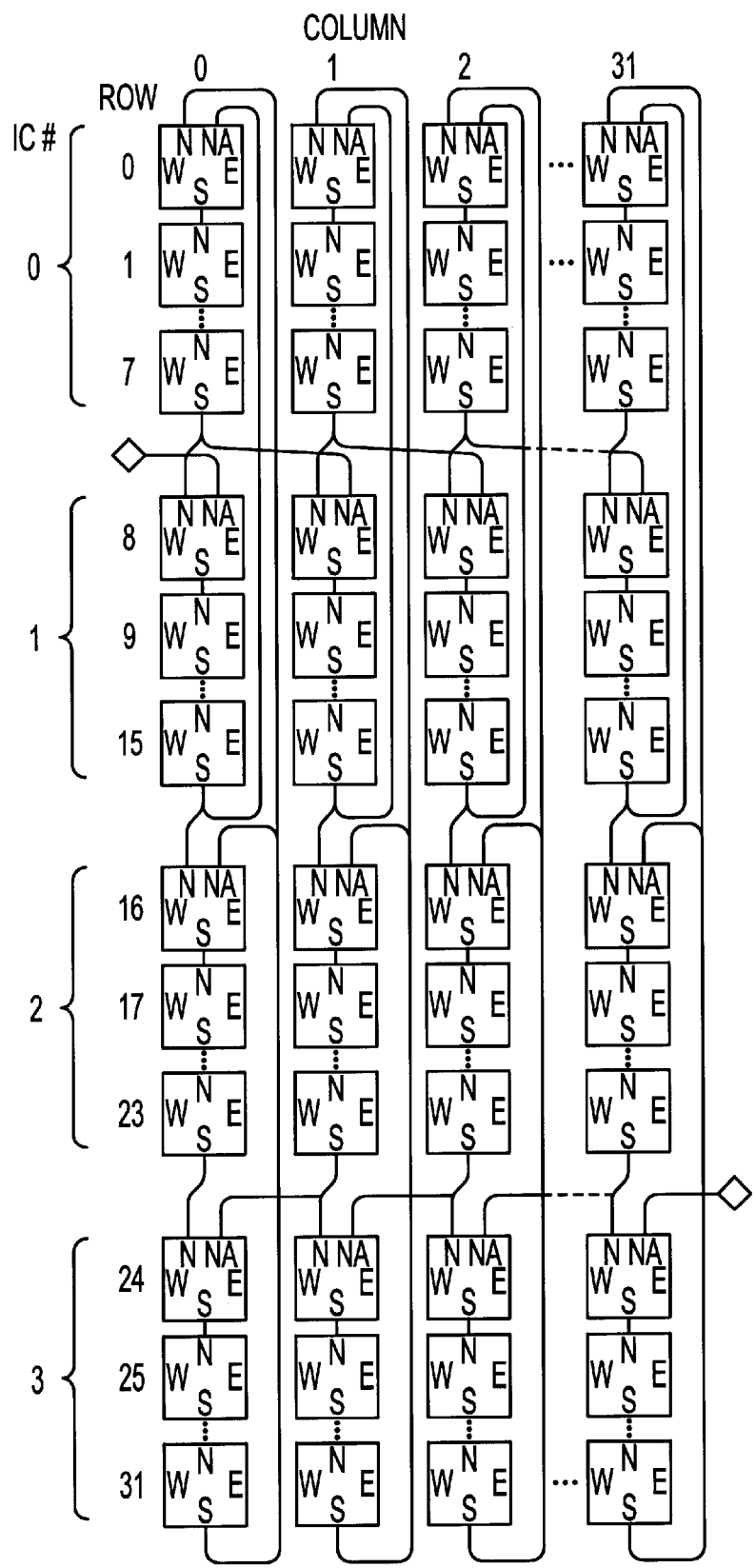
Figure 3C:
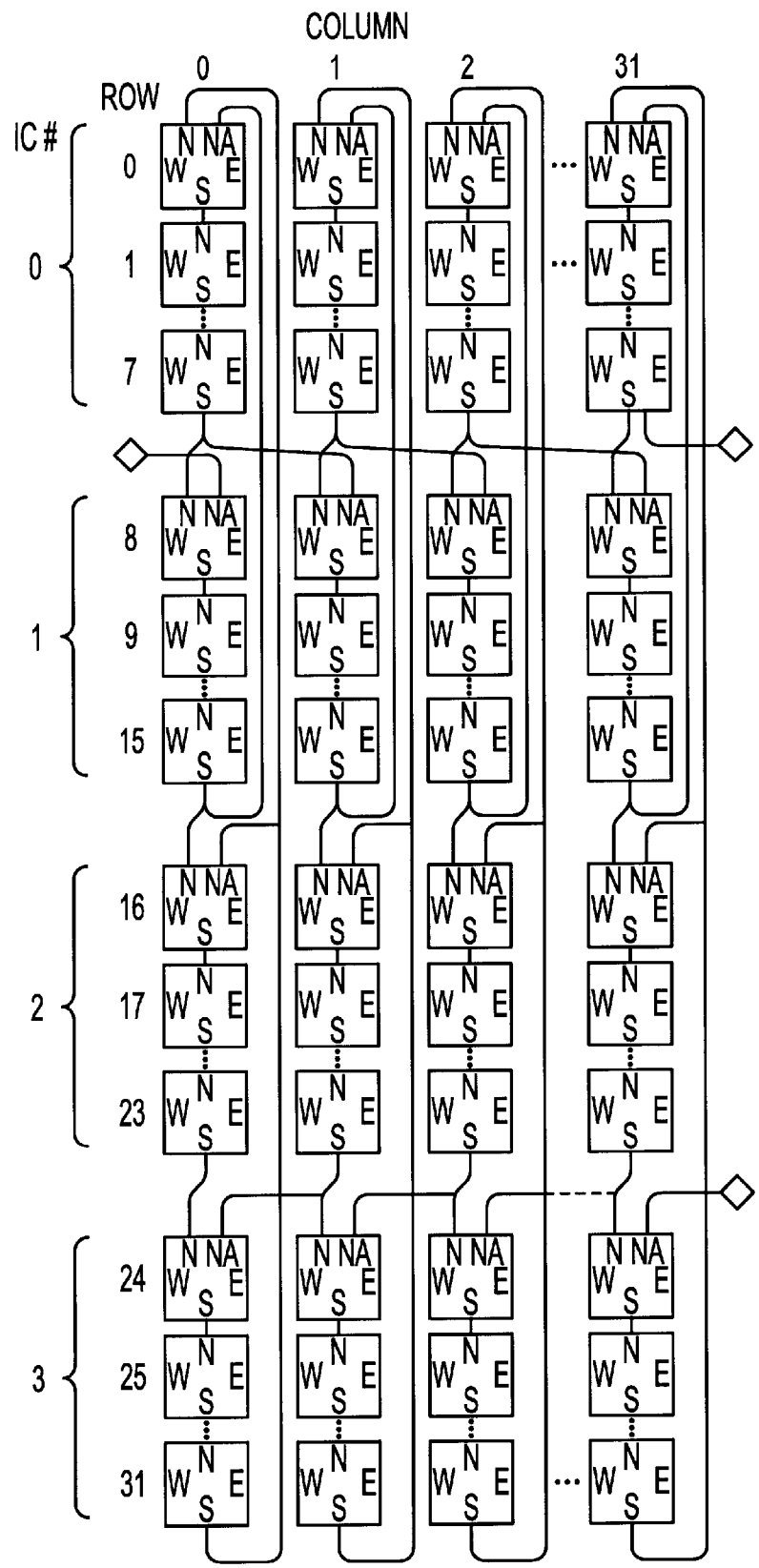

The other multiplexer network comprises bidirectional semiconductor switches or multiplexers $M_1"$ through $M_8"$ on the eight north edge cells. These allow selection of either a "normal" north data path (to data input/output unit 30) or an "alternate" north data path (to another cell on the same or a different chip). The array 10 is thus no longer limited to north, south, east, west connectivity. For example, consider a 32×32 array made up of 32 subarrays of 32 cells each, with the north edge cells of each subarray being provided with a switchable north alternate connection as shown in FIG. 3(a). Each subarray may, for example, be on a separate semiconductor chip. By appropriate interconnection of north and north alternate inputs, the array can be reconfigured as two 16×32 arrays (FIG. 3(b)) or as one 1024×1 array (FIG. 3(c)). Thus, the second multiplexer network has great utility in varying connection of multiple-chip arrays.

The north alternate connector may also be connected to a memory device to extend logically the memory capability of each cell and to allow data operands to be rolled in and rolled out as necessary. It also provides a port which can be connected to an I/O device or other processing cells in the array to allow for corner turn operations.

Figure 4:
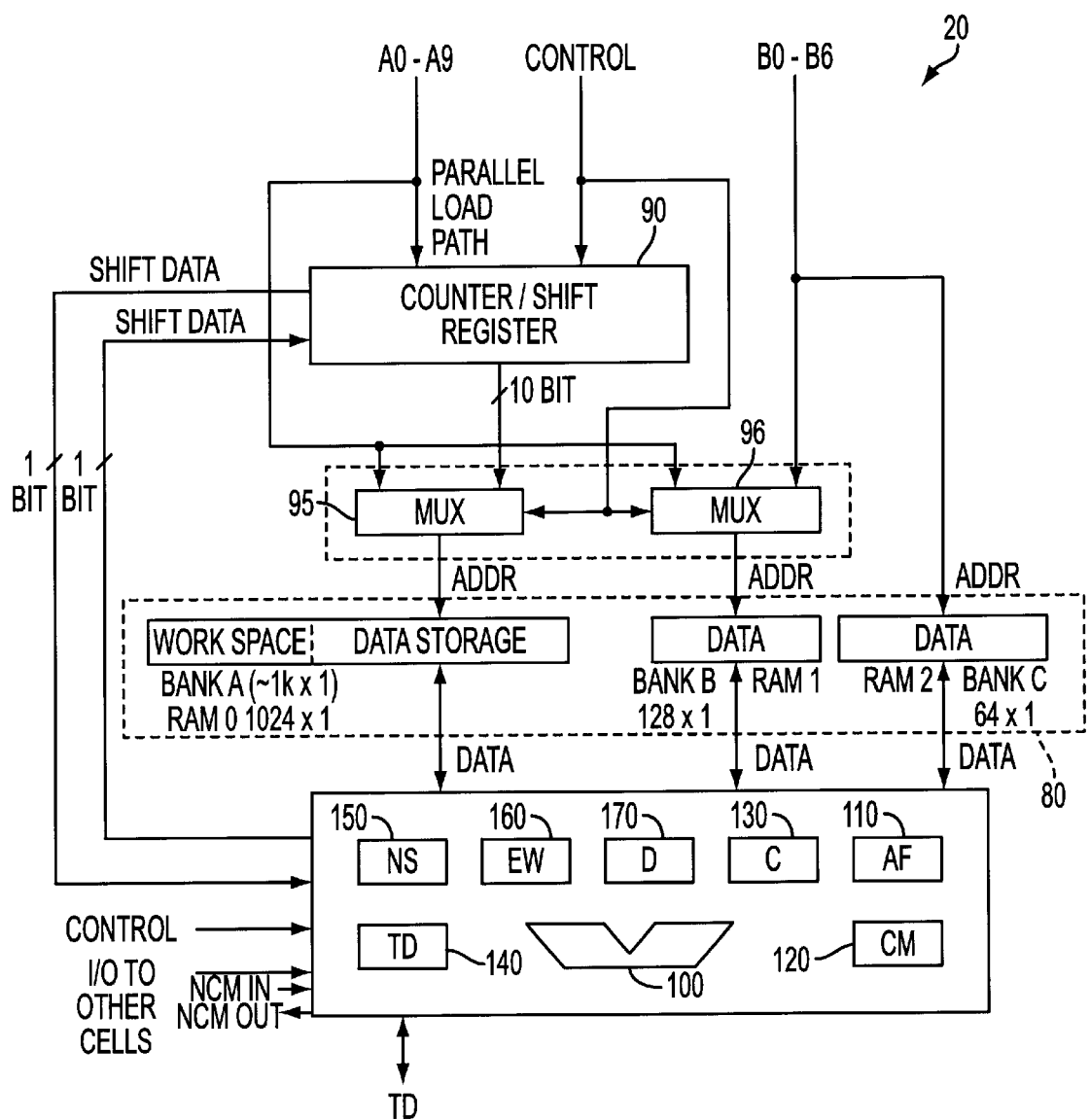
FIG. 4 is a block diagram of a preferred embodiment of a cell in FIG. 1 for a parallel bit serial data processor useful for implementing the present invention.

FIG. 4 is a block diagram of exemplary internal architecture of a cell 20 useful for implementing the present invention in the ASAP system described above. As can be seen therein, the cell 20 in an exemplary ASAP includes a memory 80 which in an exemplary embodiment is a static random access memory or RAM. There can be, for example, three segments to the memory, one which is 1024×1, another which is 128×1, and a third which is 64×1, which combine for a total of 1216×1 bits of memory. It will be understood by one of ordinary skill in the art, however, that a unitary memory could be used. The cell 20 in an exemplary ASAP also contains 17 registers, 10 of which (A0–A9) are used in a shift register/counter (SRIC) 90, and the other 7 (B0–B6) which will be described below. The registers are positive edge triggered devices all continuously clocked from a common source. Each register can hold its state indefinitely as required by the master controller 60. Data transfer between registers is effected in one clock cycle. The cell 20 in an exemplary ASAP also contains various multiplexers and a single bit ALU or adder 100, all of which will be described below.

As mentioned above, memory 80 can have 1216 bits of static memory. These are divided into three blocks designated Bank A or RAM0 (1024 bits×1 bit), Bank B or RAM1 (128×1), and Bank C or RAM2 (64×1). The three segments each have a data input port. The first and largest segment RAM0 can be addressed globally (extracellular) via address lines A0–A9 (AADR(00:09)) or locally (intracellular) via parallel output from the SR/C 90. RAM1 can be addressed via address lines A0–A6 (AADR(00:06)) or B0–B6 (BADR (00:06)). A global multiplexer 96 generates the address for RAM1. RAM2 has only one address source, global address B6 (BADR(00:06)). A global address is common to all cells in the array.

Figure 5:
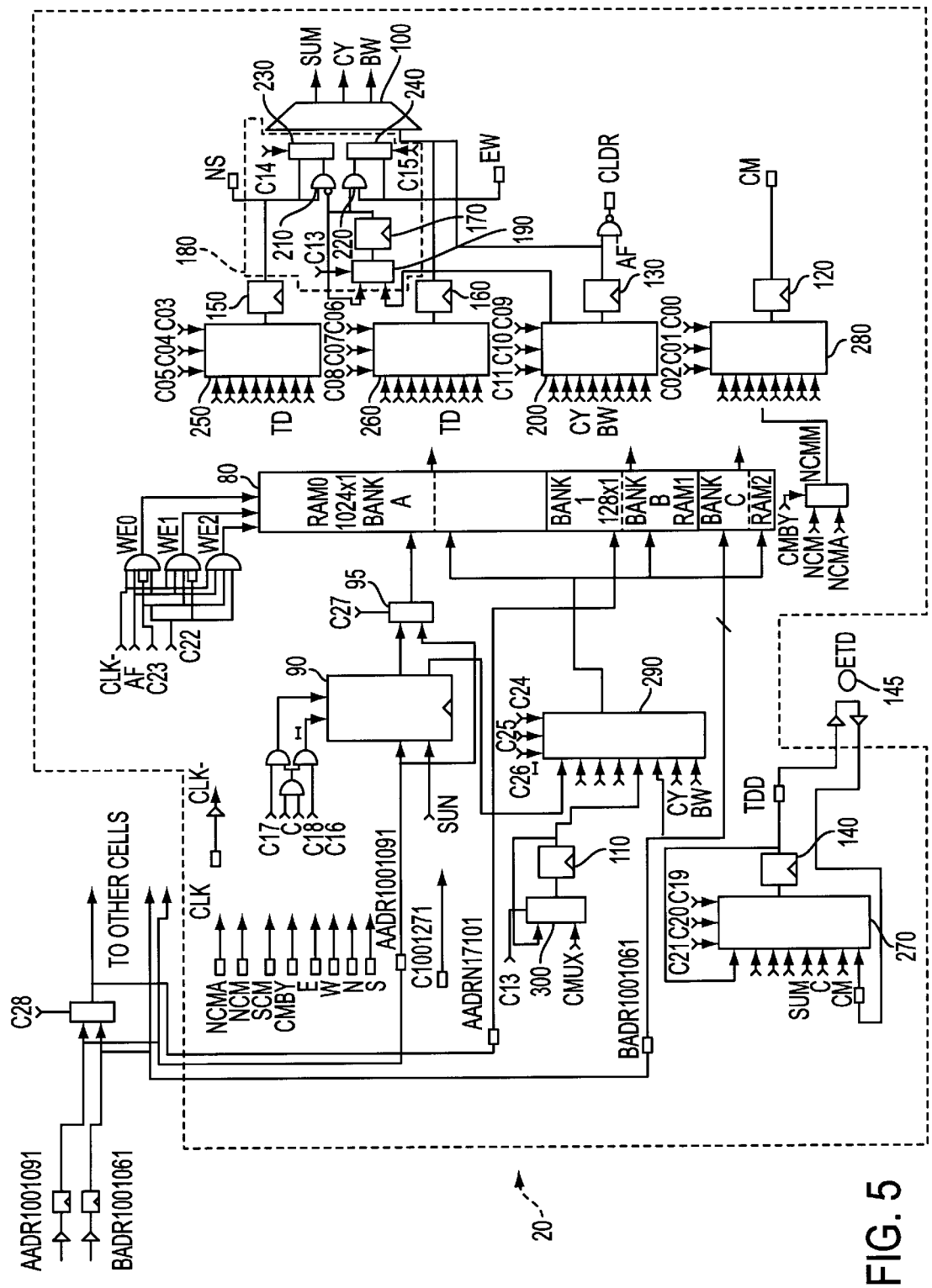
FIG. 5 is a functional block diagram of another preferred embodiment of a cell for a parallel bit serial data processor useful for implementing the present invention.

Only one segment may be written into during any given clock cycle. Which RAM segment is written into depends on control lines C22 and C23, as shown in FIG. 5. It also depends on an AF value stored in an "Activity Flag" or "AF" register, as described below. Briefly, if the AF value is zero, indicating a deactivated cell, writes to the memory 80 are disabled.

The memory 80 may receive data from the serial output of SR/C 90, the sum, carry, or borrow output of ALU 100, or from the AF register 110, a Communication (CM) register 120, a Carry (C) register 130, or a Third Dimension (TD) register 140. These last three registers will be described in more detail below.

The segmented nature of an exemplary embodiment of the memory 80 permits simultaneous read/write operations. Although only one segment can be written into in any given clock cycle, data can be read from the other two segments which are not written into. If no segment is being written into, then all three segments can be read. Data from all three segments can be loaded directly into the TD register 140 and the CM register 120, as well as into an NS register 150 and an EW register 160. The C register 130 and a D register 170 can obtain data only from RAM0.

It has been mentioned above that the cell 20 in an exemplary ASAP can also contain a 10-bit shift register/ counter SR/C 90. This element is a means for generating effective address signals locally. The 10 bit parallel output of the SR/C 90 is connected to the address input of RAM0 through an address multiplexer 95 to provide the cell 20 in an exemplary ASAP with local addressing capability for RAM0. The SR/C 90 also provides a serial shift register input to any of the three segments of the memory 80 through multiplexer 290, as shown in FIG. 5. The serial output port of the SR/C 90 is the most significant bit of the register. This output can be written into any of the three segments of the memory 80.

The SR/C 90 can be loaded through a serial input port or a parallel input port provided thereon. The parallel input port is connected to the AADR address bus. The serial input port is connected to the sum output of the ALU 100. The sum output can be used to load the SR/C 90 from the memory 80. In other words, data can pass from the memory 80, along an appropriate path through the network of multiplexers, registers, and gates to the ALU 100 and then pass through the ALU 100 unchanged to be loaded into the SR/C 90 through its serial input.

Figure 6:
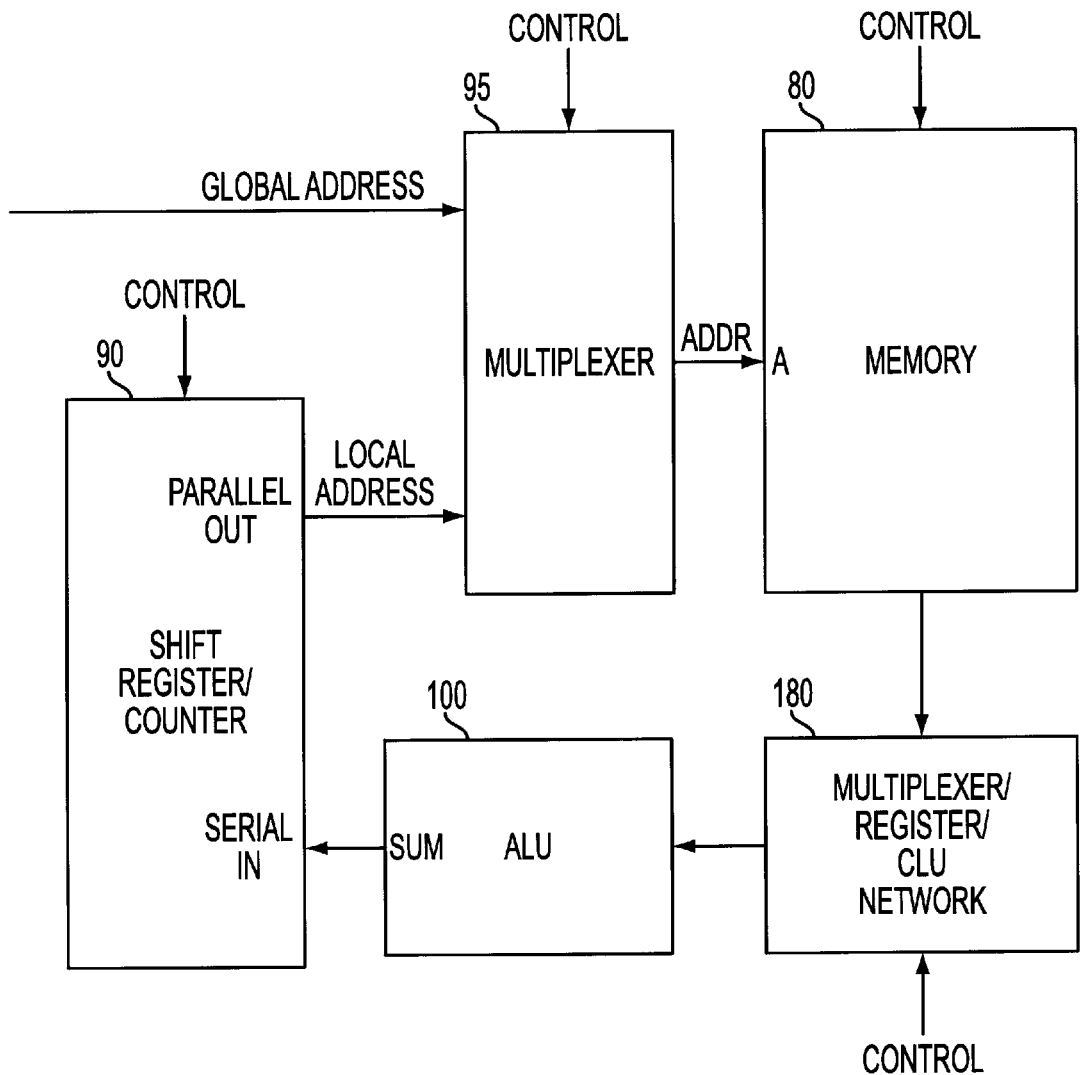
FIG. 6 is a diagram illustrating an operation of the local address generation function of the cell of FIG. 4.

It is also possible, however, to have the ALU 100 perform an arithmetic or logical operation on the address data. Such an operation is illustrated in FIG. 6. Initially, address data may be loaded into memory 80 externally through the address multiplexer 95. This address data and data representing an offset value may then be passed along through conditional logic unit (CLU) 180 to the ALU 100 which adds them and passes the resultant effective address to the SR/C 90. SR/C 90 may then be incremented, under either global or local control, in order to access multiple bit words through the address multiplexer 95. Each bit is stored sequentially in the memory 80.

In a more advanced utilization, the offset value or effective address may be calculated from the data set. This may prove useful, as described below, in the implementation of floating point arithmetic. This powerful but logically simple innovation thus allows independent addressing of the memory 80 for each cell, within a SIMD environment as a function of predefined address offsets or as data dependent address offsets.

Figure 7A:
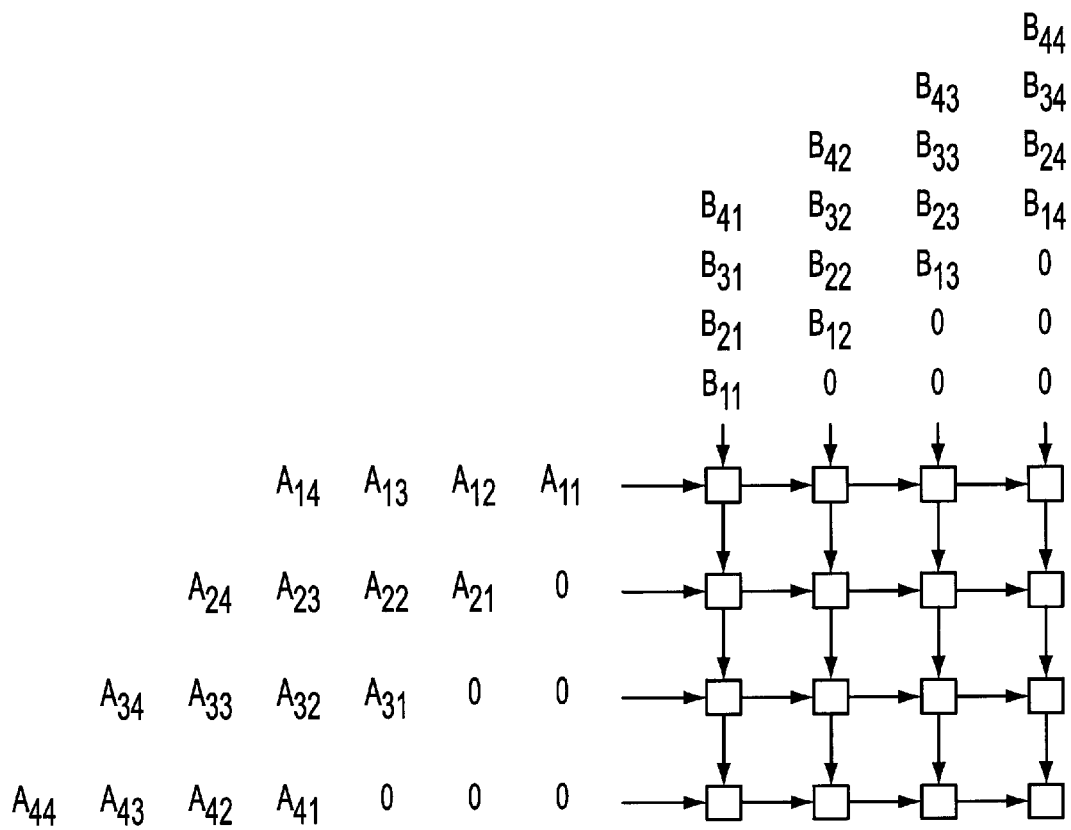
FIGS. 7(a) and (b) are diagrams comparing a skewed matrix operation without and with local address generation.
Figure 7B:
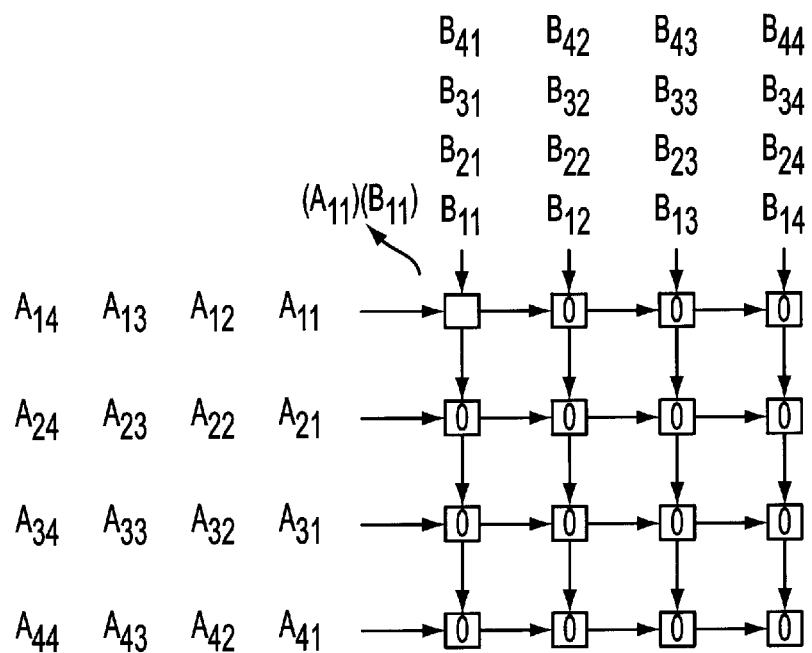

As an example of the usefulness of the local address generation capability created by the incorporation of SR/C 90, consider the problem of matrix arithmetic performed using a systolic array or a parallel array of simple processors. There are many known methods for matrix calculations using systolic arrays. An area that is neglected is the formatting of data for introduction into the array, that is, the hardware cost. A fairly standard example is illustrated in FIG. 7(*a*). The data is skewed in time both going into the array and coming out of the array. Individual internal memory addressing makes it possible, however, for the data to be easily loaded in block form and then skewed in time within the array for processing in a typical systolic fashion. This is illustrated in FIG. 7(*b*). Using this approach, standard interface logic may be used.

The local addressing capability also makes it possible to implement true floating point arithmetic. An obstacle to the implementation of floating point arithmetic on prior SIMD machines is that the single instruction architecture is not amenable to operands being individually normalized prior to computation. The local address generation capability enables the exponent of a floating point number to be used as an index for a scratch memory location, thereby normalizing the operands prior to computation.

The cell 20 in an exemplary ASAP, as mentioned above, also includes an ALU 100. In an exemplary embodiment, the ALU 100 is a single-bit full adder/subtractor with conditional control of the input operands. The details of this conditional logic are shown in FIG. 5. Therein, it can be seen that a conditional logic unit or CLU 180 includes an input multiplexer 190 with an input connected to the output of a C multiplexer 200 and to the output of the D register 170. The input multiplexer 190 is controlled by an appropriate control signal. The output of multiplexer 190 is connected to the input of the D register 170. The output of the D register 170 is also connected to a first logic gate 210 and a second logic gate 220. In FIG. 5, these are both AND gates. One input of the first logic gate 210 is connected to the output of the NS register 150; the other is connected to the output of the D register 170 and, as shown in FIG. 5, is an inverting input. One input of the second logic gate 220 is also connected to the output of the D register 170; the other is connected to the output of the EW register 160.

The CLU 180 also includes a first output multiplexer 230 and a second output multiplexer 240. The inputs for the first output multiplexer 230 are the outputs of the NS register 150 and the first logic gate 210. The inputs for the second output multiplexer 240 are the outputs of the EW register 160 and the second logic gate 220.

The CLU 180 allows for conditional arithmetic operation and conditional selection operation on the NS value of the NS register 150 and the EW value of the EW register 160 based on the D value of the D register 170. This leads to great simplification of operations such as multiplication. For example, without conditional logic, the method for multiplication of two multi-bit numbers involves a reiterative process of "ANDing" the first bit of the multiplier with the multiplicand to form a first partial sum, and then "ANDing" the second bit of the multiplier with the multiplicand and adding the result to the first partial sum to form a second partial sum, continuing for each successive bit until the product is formed. The CLU 180 eliminates the requirement for "ANDing" by providing a conditional summation capability. This allows the partial sum to be conditionally added to the multiplicand based on the present multiplier-bit value.

The sum, carry, and borrow output from the CLU 180 and ALU 100 can be written into any one of the three segments of the memory 80 within one clock cycle. The sum output can also be loaded into the TD register 140, and the carry and/or borrow outputs can be loaded into the C register 130.

The TD register 140 allows each cell 20 in an exemplary ASAP to communicate with an external device bidirectionally. The TD register 140 can be loaded from any one of the three segments of memory 80, the sum output from the ALU 100, the C register 130, the CM register 120, and from an external bidirectional port 145. The contents of the TD register 140 can also be held. The contents of the TD register can be written into memory, loaded into the EW register 160, loaded into the NS register 150, or transferred to the external bidirectional I/O port 145. These data transfers from the TD register can occur in parallel. Communication with an external device and intercell communication (e.g., via the CM register 120) can occur simultaneously.

Figure 8:
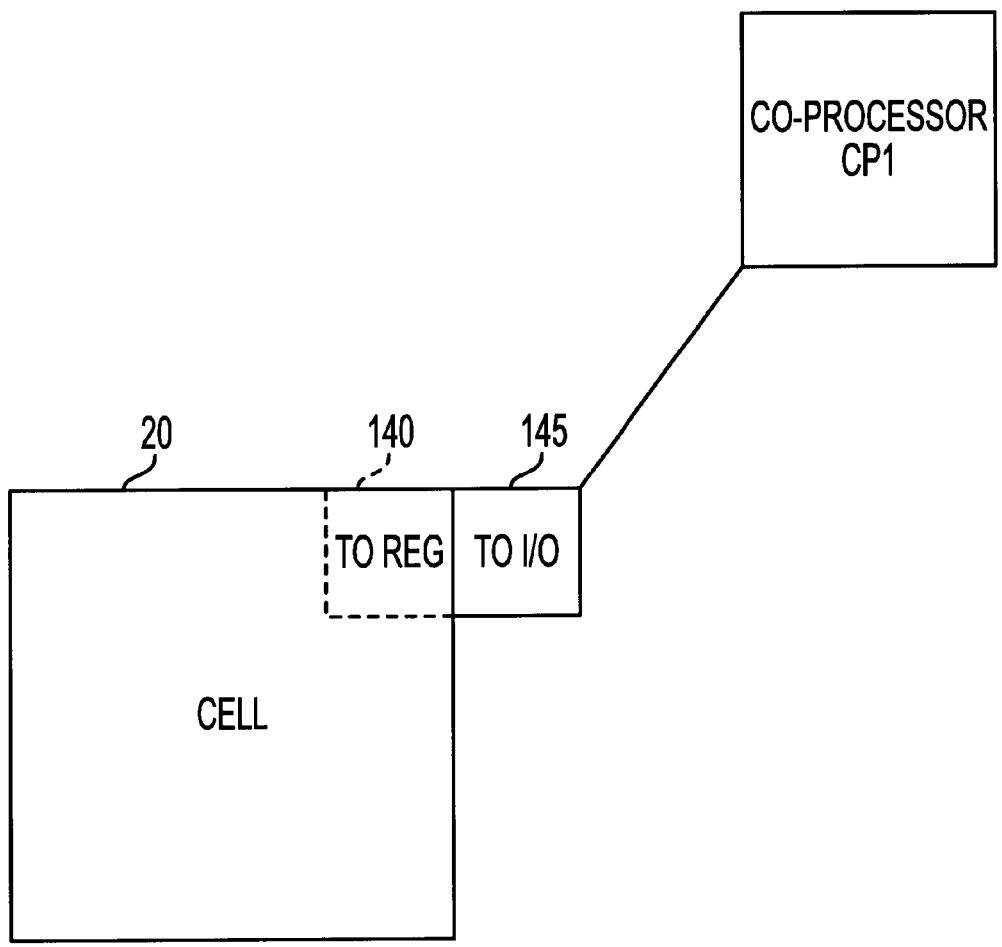
FIG. 8 is a functional block diagram of interconnection of a cell with a coprocessor useful for implementing another preferred embodiment of the present invention.

One especially useful function of the communication line established through the TD register 140 is the capability of using a co-processor. An example of this is shown in FIG. 8, in which the bidirectional I/O port 145 of a cell 20 in an exemplary ASAP is connected to a co-processor CP1. This co-processor CP1 can be an accelerator of some type used for certain operations or a programmable interconnect network to facilitate data transfers which would enhance the performance of specific methods.

Figure 9:
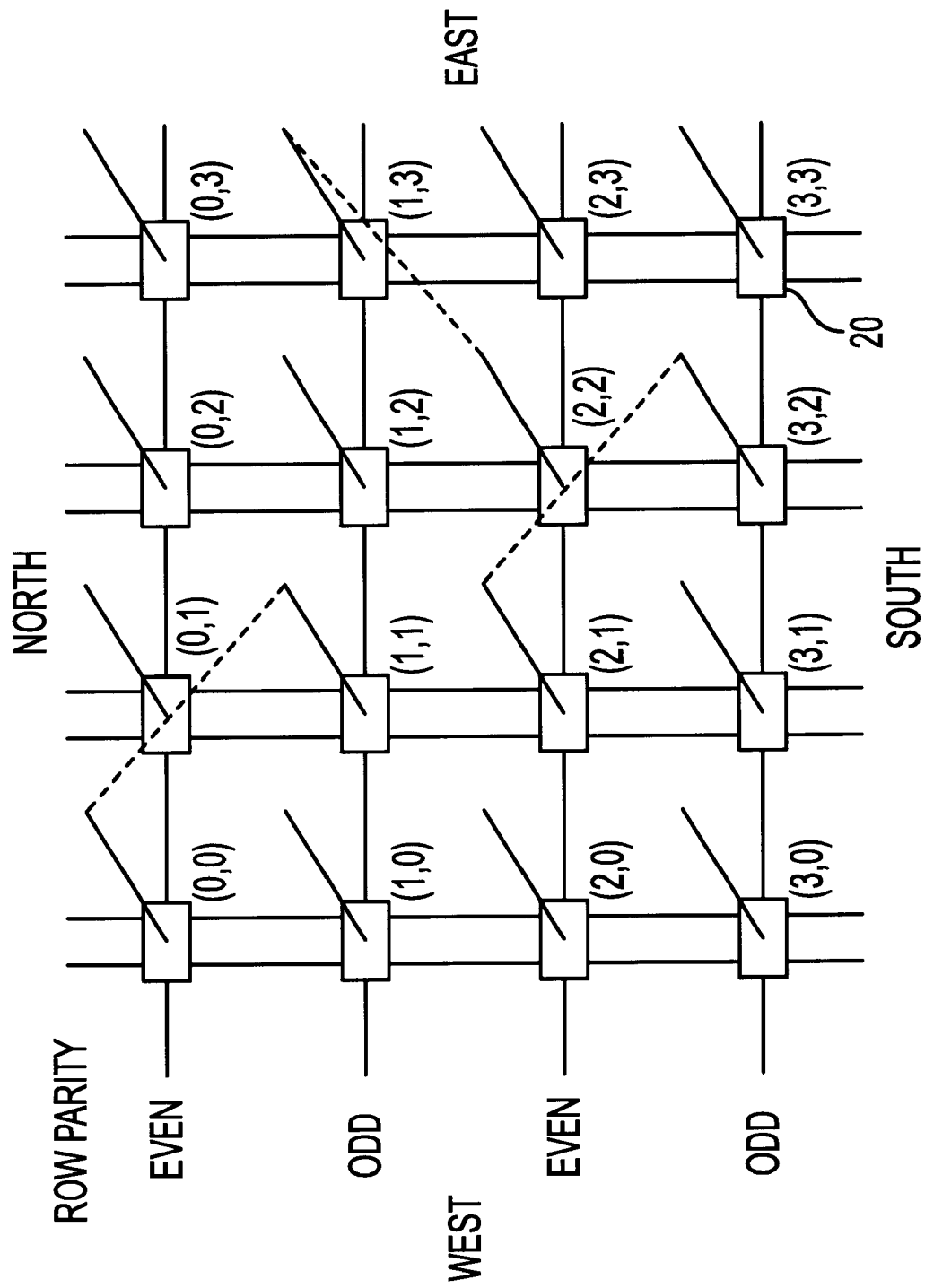
FIG. 9 is a schematic diagram showing a pattern of cell interconnection using cells useful for implementing a preferred embodiment of the present invention.

The TD registers 140 of cells 20 in an exemplary ASAP can also be connected directly. In one arrangement, the cells 20 in an exemplary ASAP are partitioned into even rows and odd rows. FIG. 9 gives an example of a 4×4 array in which rows have been assigned "parity". The third dimension (TD) register 140 can thus be configured to such a way as to allow communication between cells which are not nearest neighbors. This is accomplished by modifying the control signals affecting the TD registers 140 and physically connecting TD I/O ports 145 together.

There are many possible examples showing the usefulness of the TD register 140. As an example, external data may be loaded simultaneously with a floating point computation. The floating point computation can be divided up such that the exponent calculation would reside in the ALU 100 and the mantissa calculation would reside in a high speed dedicated bit serial multiplier coprocessor, linked by the TD path. A ten-fold improvement in floating point multiply times can thus be achieved by adding only twenty-five percent more hardware in the form of co-processor multiply chips.

The technique may be extended beyond floating point multiplication to any of the more complex, time consuming arithmetic operations such as square root and divide. This technique may be extended even further to the point of having multiple different computational memory resources sharing the same TD port. Basic methods such as singular value decomposition (SVD) could be implemented more easily using the third dimension connections for additional external cell storage. Fast Fourier transform (FFT) signal processing could also be enhanced. Due to the symmetry of the FFT, the complex conjugate computation is really only a sign change and is folded back. Thus, only four horizontal rows of cells are required. The interstage shuffling of data is passed horizontally by nearest neighbor connections and diagonally by TD ports 145. These diagonal paths would be programmed external to the array 10.

The AF register 110 shown in FIG. 5 is loaded via the output of the C multiplexer 200 via an associated AF multiplexer 300 line select and is controlled by an appropriate control signal. Writes to all three banks of the memory 80 are disabled if the AF value in the AF register 110 is 0. Also, the AF value is ANDed with the C value in the C register 130 to obtain the global output GLOR signal. This global output signal is used for global branch operations in the array. The output for the array is forced to a predetermined state if any one of the cells 20 in an exemplary ASAP is active.

Figure 10:
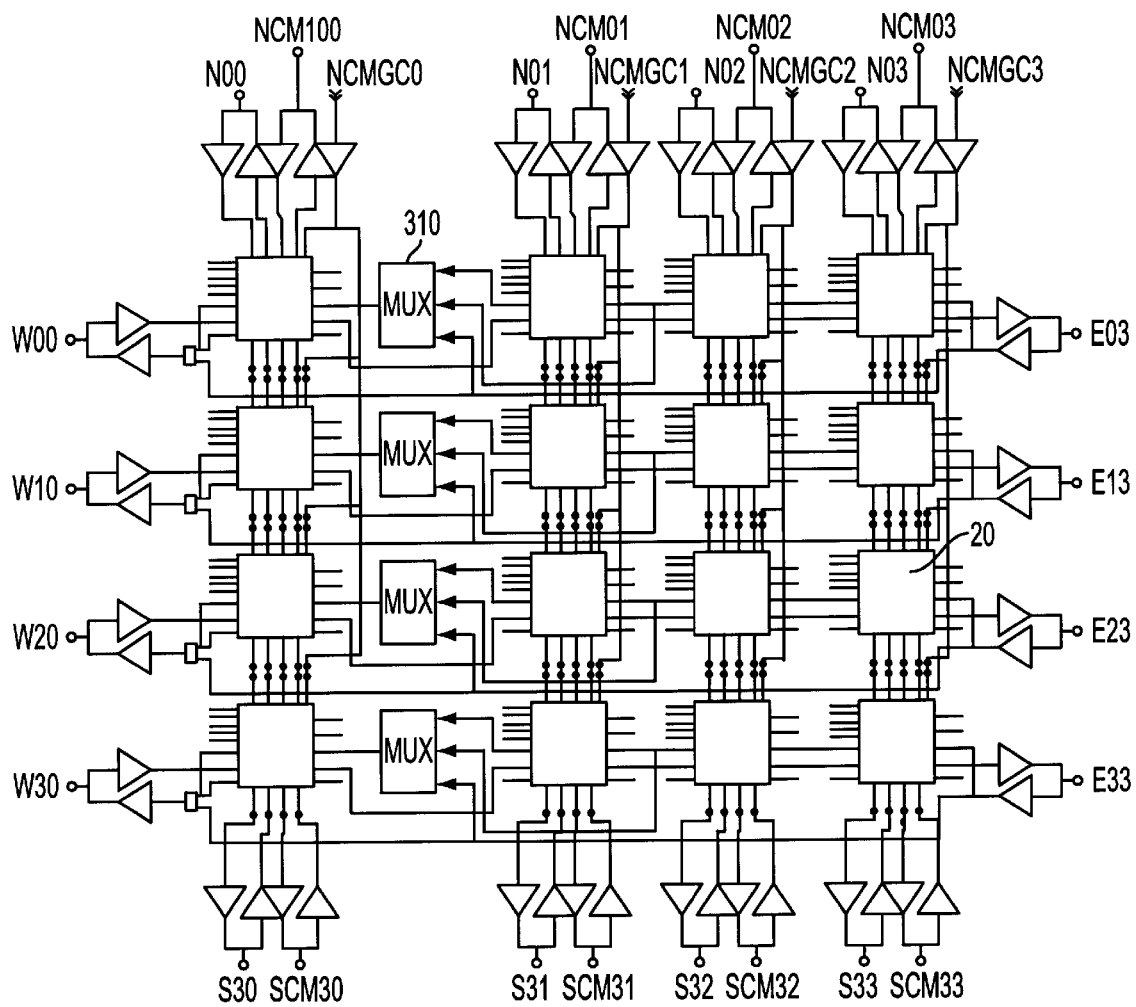
FIG. 10 is a functional block diagram of a 4×4 array of cells.
Figure 11:
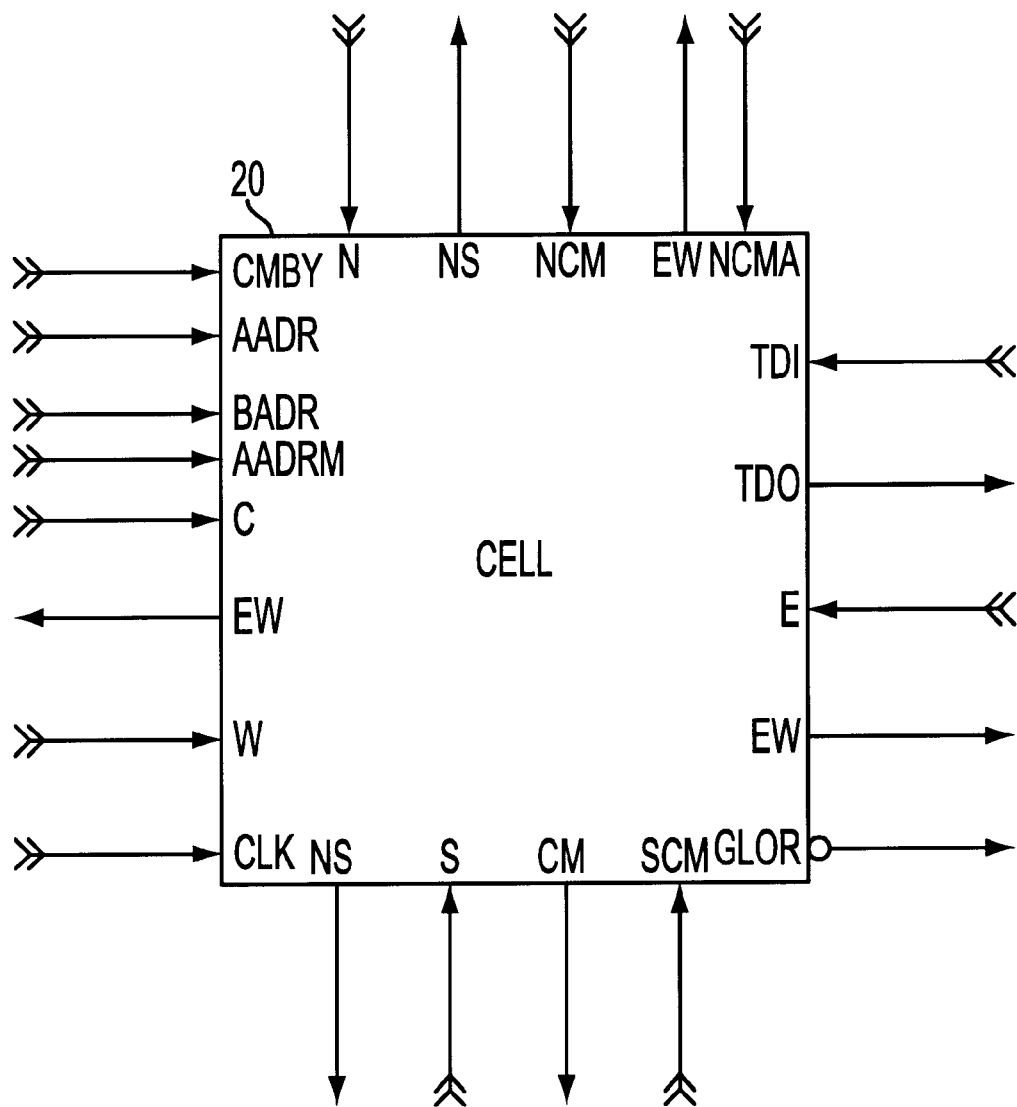
FIG. 11 is a key for showing I/O connections for a typical cell in the array of FIG. 10.

FIG. 10 shows a 4×4 array with cells having inputs as shown in FIG. 11. Each cell 20 in an exemplary ASAP has the capability of communicating with its nearest neighbors. There are bidirectional communication lines along the periphery of the array 10 to allow north to south, south to north, east to west, and west to east communication with another array, or what may properly be regarded as another section of the same array if the 4×4 array depicted in FIG. 10 is regarded as being on one chip. Each cell 20 in an exemplary ASAP can also have the external I/O TD port 145 which allows communication with an external device. If an external device is used then each cell may be conceived of as having five nearest neighbors.

The foregoing describes particular array processors which are especially well adapted to carry out the method of, and serve as part of the apparatus of, the present invention. The principles of the invention will now be described in connection with the arrays. The above-described SIMD devices are particularly advantageous for implementing the multi-resolution image processing of the present invention which is described in detail below.

Figure 12:
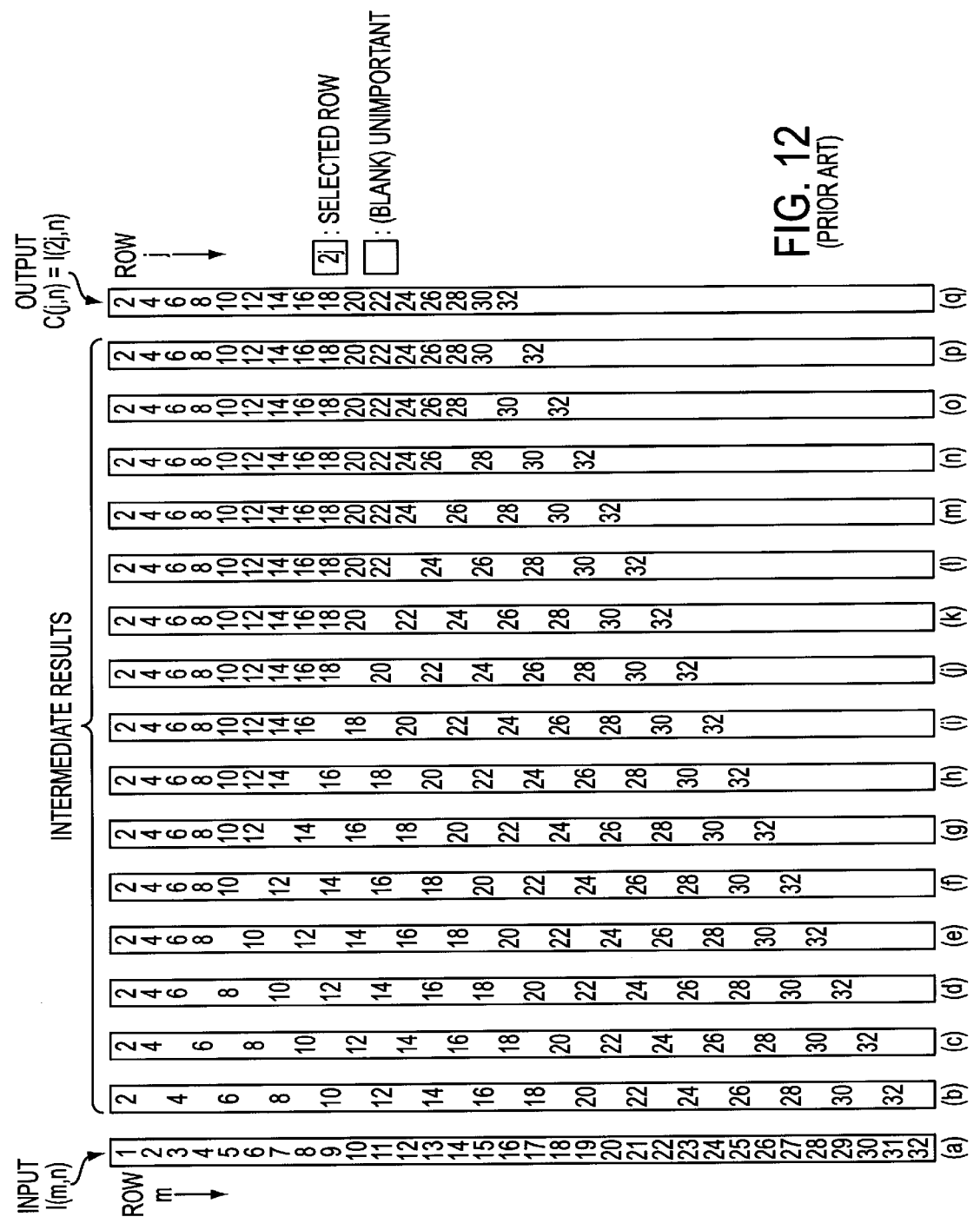
Figure 13:
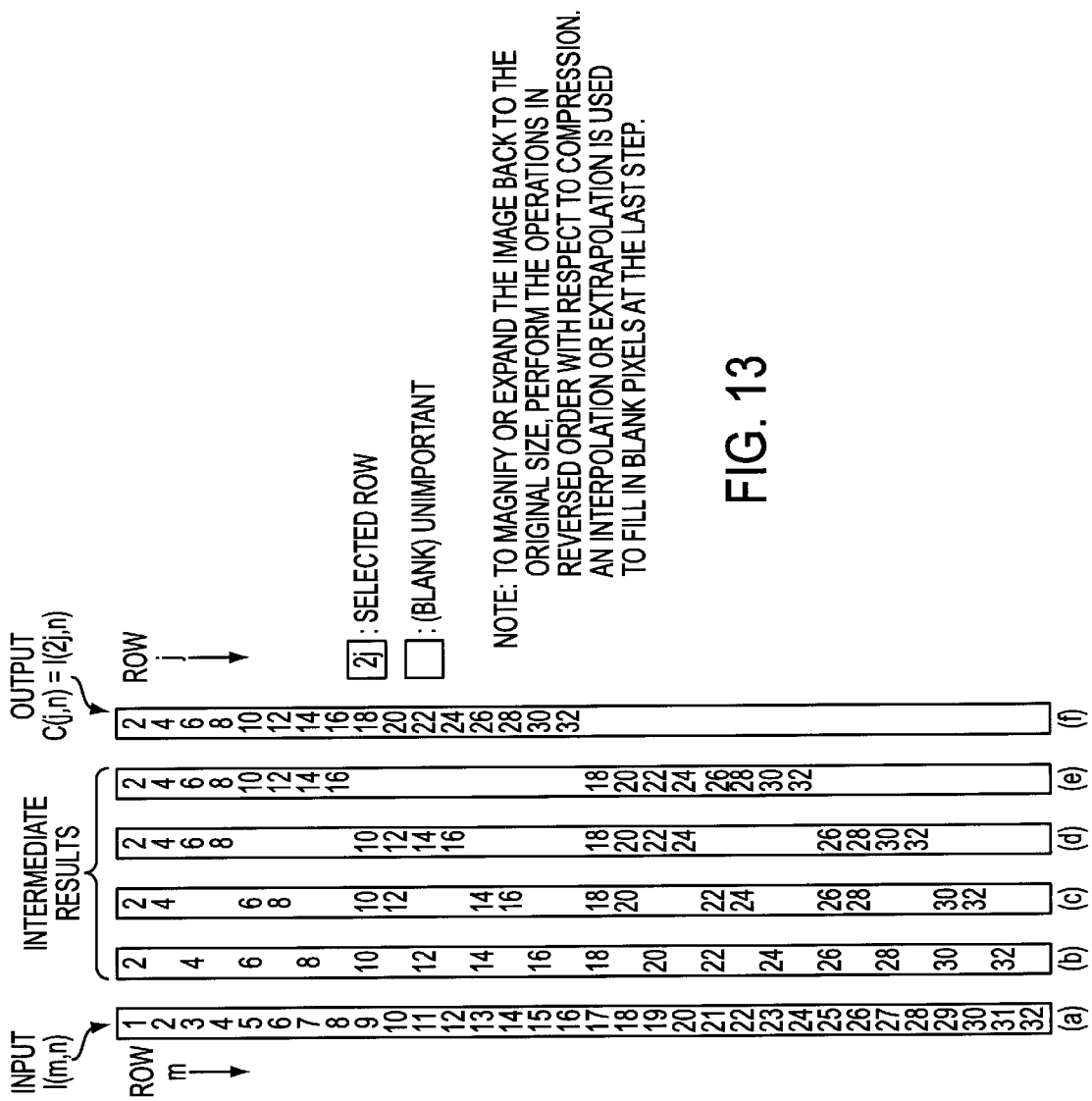
FIGS. 13(a)–(f) illustrate a fast method for image compression according to an exemplary embodiment of the present invention, showing row compression.
Figure 14:
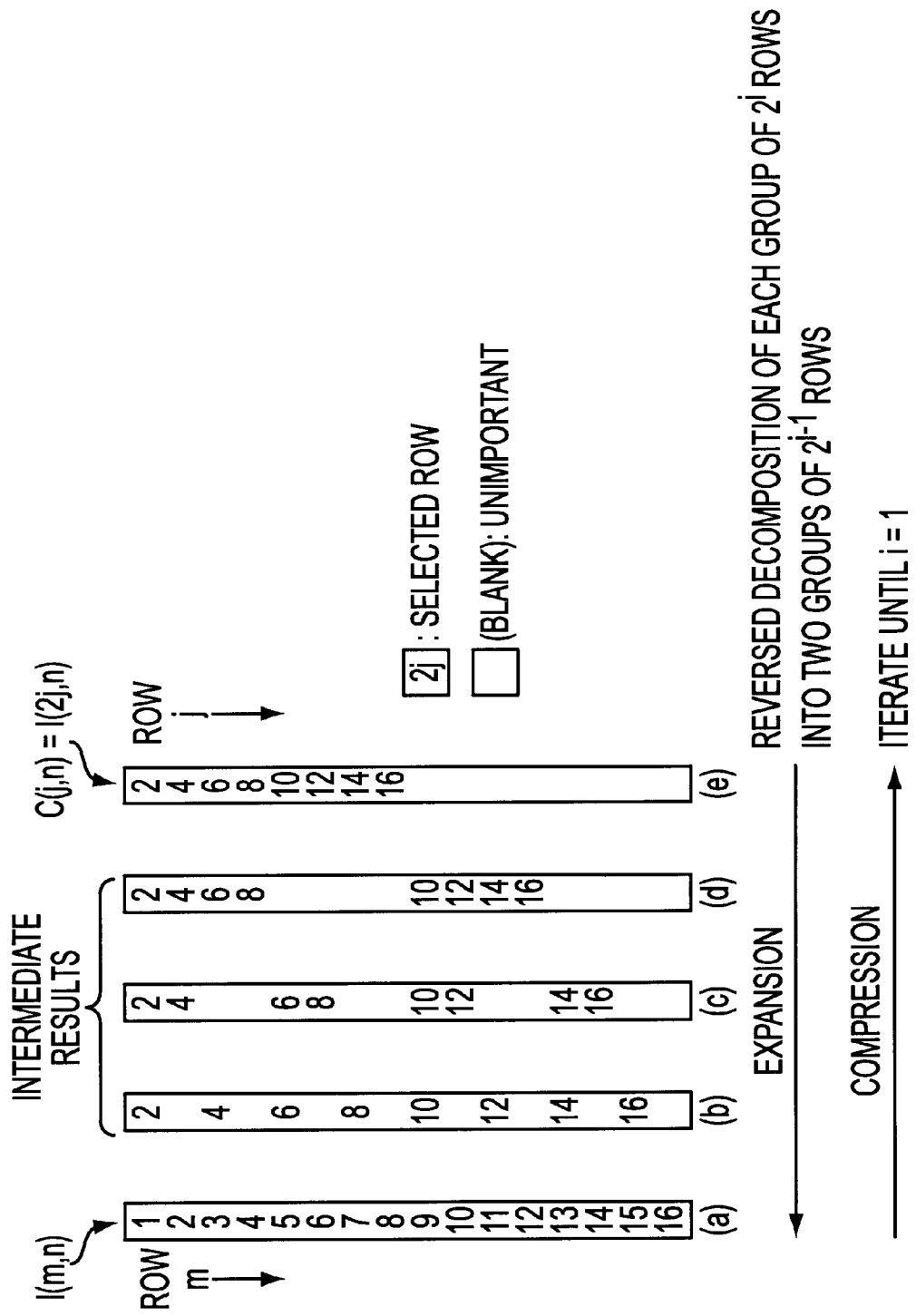
FIGS. 14(a)–(e) illustrate a fast method for image compression according to another exemplary embodiment of the present invention, showing row compression.

The method according to the present invention more fully exploits the parallelism of the SIMD machine. In the conventional method described above, effectively only one row (or column) is copied at a time, as shown in FIGS. 12(*a*)–(*q*). In a method according to the present invention, on the other hand, multiple rows (or columns) are copied in parallel at the completion of each shift sequence, as shown in FIGS. 13(*a*)–(*f*) and FIGS. 14(*a*)–(*e*). These simplified diagrams show only one of 2N columns that are processed concurrently.

For example, for scaling factor K=2, to obtain a compressed image containing rows 2, 4, 6, 8, . . . , 32 of the original image as shown in FIG. 12(*q*), the old method must shift and copy 16 times, one row at a time. In a method according to the present invention, however, two subimages are constructed concurrently containing rows 2, 4, . . . , 16 and rows 18, 20, . . . , 32, respectively, as shown in FIG. 13(*e*). Processes of this kind are referred to herein as "parallel aggregation". The resulting subimages are examples of aggregates. The construction of these two subimages requires only 4 copying operations. They can be combined to render the result in FIG. 13(f). The actual implementation for compressing 32 rows of image data into 16 rows begins with concurrent construction of 16 subimages, each containing one row as shown in FIG. 13(*b*). The process continues with concurrent construction of multiple subimages, each containing 2 rows and then 4 rows and then 8 rows, as shown in FIGS. 13(*c*)–(*e*), respectively. As the number of rows in each subimage increases, the number of the subimages decreases, until the process results in only one subimage, as shown in FIG. 13(*f*). The compression of columns can be implemented in a similar manner.

Although the new, fast parallel method implemented in the present invention requires about the same number of shift operations as the known parallel method, the number of copying operations required by the present invention is substantially reduced, in part because the parallel processing afforded by the parallel processing array is more fully exploited and the copying operations are carried out substantially in parallel. The total number of shift operations is about:

$$(M+N) \times k$$

for a 2M×2N-pixel image, where k is the number of bits representing each pixel. This is also about the same as the number of copying operations required by the known parallel method. By way of contrast, the number of copying operations required for the new, fast parallel method implemented in the present invention is only about:

$$(\log_2(M+1)+\log_2(N+1)) \times k < (M+N) \times k$$

for a 2M×2N-pixel image, where k is the number of bits in each pixel, and where M and N are both greater than one. The complexity of the new, fast parallel method is O($\log_2$(M+1)+$\log_2$(N+1)). The compression of a 108×384-pixel image (8 bits per pixel) down to a 54×192-pixel image (8 bits per pixel), including the generation of row and column addresses, requires 7,344 GAPP instructions compared to 20,316 instructions for the previous method. The reduction in the number of instructions becomes even more dramatic for larger images with larger values of M and N.

Depending on the applications, some noise reduction operator such as a mean or median filter can be applied to the original image before the compression, as described, for example, in the above-mentioned Gonzalez and Woods reference. In general, the scaling factor K can be any proper positive integer, and the rows and columns do not have to share the same K.

Figure 15A:
FIGS. 15(a)–(c) show examples of image compression and expansion according to a preferred embodiment of the present invention.
Figure 15B:
Figure 15C:
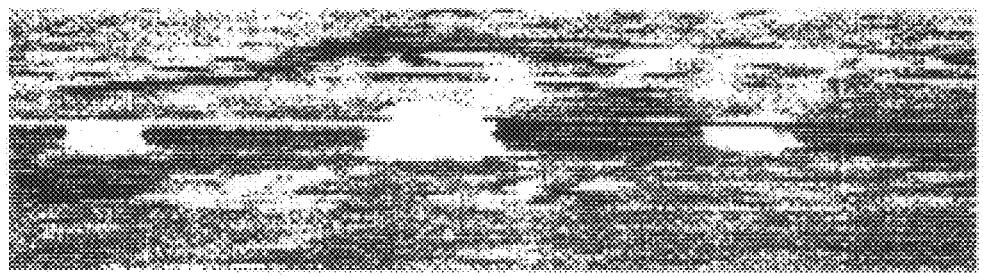

A fast method for image magnification or expansion can be implemented on the GAPP array by performing the operations in a reverse order relative to the compression method. During the expansion, each row and column will be replicated a number of times determined by the appropriate scaling factor(s). In other words, the size of each pixel will be magnified. Depending on the applications, pixel-interpolation rather than direct replication may be used in the expansion. For example, an interpolation or extrapolation can be used to fill in blank pixels at the last step in the expansion from FIG. 13($b$) to FIG. 13($a$). As shown in FIGS. 13($a$)–($f$) and FIGS. 14($a$)–($e$), for scaling factor K=2, each aggregate or group of $2^R$ rows is separated or partitioned into two aggregates or groups of $2^{R-1}$ rows each. Processes of this type are referred to herein as "parallel separation". The resulting subimages are additional examples of aggregates, or of subsets. This separation process is then iterated R times. FIGS. 15($a$)–($c$) are an example showing a 108×384-pixel image in FIG. 15($a$) being compressed down to a 54×192-pixel image in FIG. 15($b$), useful for processing by an existing object detector using small operators, and then subsequently being expanded back to a 108×384-pixel image in FIG. 15($c$), useful for feature extraction, using an embodiment of the fast image compression and expansion methods of the present invention. If necessary, the "blockiness" of the expanded image can be reduced by some interpolative smoothing process. If the row and column addresses are available and do not need to be generated by the GAPP array, the expansion method requires only 3,898 GAPP instructions.

The method and apparatus of the present invention are especially useful in several areas. An area of particular usefulness is in real-time image processing. An exemplary application in this area will now be discussed.

There is a need to provide real-time image processing in both the spatial and frequency domains based on fast image compression and/or expansion for image filtering, image analysis, better pattern recognition, image display, image registration, object tracking, bandwidth compression, superresolution, and multiresolution image processing. Referring again to FIG. 1, these capabilities may be realized if the data input/output device 30 is a form of image sensor such as an infrared sensor, a sonar sensor, or even a video input device such as a camera. The signals are provided to the data input/output device 30 which, in cooperation with the controller 60, performs preliminary data forming and data shaping operations and loads the formed and shaped data from the data input/output device 30 into the GAPP array 10. Without further costly transferring of data into and out of the GAPP array 10, the fast image compression and/or expansion processing of the present invention transforms the input data as described herein, and outputs the transformed data signals to the data input/output device 30 which, in cooperation with the controller 60, outputs the transformed image signal for further applications.

This is only one application. It will be apparent to one having ordinary skill in the art the invention will prove useful in additional applications as well.

The present invention has been described above in terms of specific embodiments. It will be readily appreciated by one of ordinary skill in the art, however, that the invention is not limited to these embodiments, and that, in fact, the principles of the invention may be embodied and practiced in devices and methods other than those specifically described above. For example, it has already been mentioned that other geometries for the arrays may be useful. Furthermore, while the foregoing describes the processing of images using the present invention, one of ordinary skill in the art will recognize the usefulness of the present invention in the more general processing of any sensually apprehended patterns of information and intelligence. Therefore, the invention should not be regarded as being limited to these specific embodiments, but instead should be regarded as being fully commensurate in scope with the following claims. Furthermore, any element in the following claims expressed as a means or step for performing a specified function without the recital of structure, material, or acts in support thereof shall be construed to cover the corresponding structure, material, or acts described herein and equivalents thereof.

What is claimed is:

1. A method for implementing a compressive transformation of a first representation of a pattern of information made up of a plurality of picture elements into a second representation of the pattern of information, the method comprising the steps of:

first parallel aggregation of selected ones of said plurality of picture elements into first aggregates, wherein each of said first aggregates includes a copy of more than one of said picture elements; and second parallel aggregation of said first aggregates into second aggregates, wherein each second aggregate includes a copy of more than one of said first aggregates.

2. A method for implementing an expansive transformation of a first representation of a pattern of information made up of a plurality of picture elements into a second representation of the pattern of information, the method comprising the steps of:

first parallel separation of selected ones of said plurality of picture elements into first aggregates, wherein each of said first aggregates includes copies of fewer of said plurality of picture elements than said first representation; and second parallel separation of said first aggregates into second aggregates, wherein each second aggregate includes copies of fewer of said plurality of picture elements than each of said first aggregates.

3. A device for transforming a first representation of an information pattern made up of a plurality of picture elements into a second representation of the information pattern, the device comprising:

first means for parallel aggregation of selected ones of said plurality of picture elements into first aggregates, wherein each of said first aggregates includes a copy of more than one of said picture elements; and second means for parallel aggregation of said first aggregates into second aggregates, wherein each second aggregate includes a copy of more than one of said first aggregates.

4. A device for implementing a compressive transformation of a first representation of a pattern of information made up of a plurality of picture elements into a second representation of the pattern of information, the device comprising:

first means for parallel aggregation of selected ones of said plurality of picture elements into first aggregates, wherein each of said first aggregates includes a copy of more than one of said picture elements; and second means for parallel aggregation of said first aggregates into second aggregates, wherein each second aggregate includes a copy of more than one of said first aggregates.

5. A device for implementing an expansive transformation of a first representation of a pattern of information made up of a plurality of picture elements into a second representation of the pattern of information, the device comprising:

first means for parallel separation of a set of said plurality of picture elements of said first representation into first subsets, wherein each of said first subsets includes copies of fewer of said picture elements than said set; and second means for parallel separation of said first subsets into second subsets, wherein each of said second subsets includes copies of fewer picture elements than said first subset from which said second subset was obtained.

6. A method of scaling a digital representation of an image, said image being divided into M rows and N columns of P picture elements, M and N being positive integers and P being the product of M and N, said digital representation comprising P digital values each respectively indicative of a characteristic of an associated one of said P picture elements, into a scaled digital representation of said image, said scaled digital representation comprising Q digital values, Q being the product of P and a scaling factor L, said method comprising the steps of:

loading said digital representation into a processor comprising an array of at least M rows and N columns of processing elements so that each of said processing elements stores an associated loaded one of said P digital values as a stored value;

controlling each row of at least two pairs of rows of processing elements, paired rows being separated by S rows, S being related to L, to operate in parallel to cause each processing element in said each row to replace its associated loaded value as its stored value with the associated loaded digital value from a processing element in the same column at a preselected number of rows away, at least one row of each pair being one of said M rows; and controlling each column of at least two pairs of columns of processing elements, paired columns being separated by S columns, to operate in parallel to cause each processing element in said each column to replace its associated loaded value as its stored value with the associated loaded digital value from a processing element in the same row at a preselected number of columns away, at least one column of each pair being one of said N columns.

7. The method of claim 6, wherein said scaling is a compression of said digital representation of an image, said image being divided into M rows and N columns of P picture elements, M and N being positive integers and P being the product of M and N, said digital representation comprising P digital values each respectively indicative of a characteristic of an associated one of said P picture elements, into a scaled digital representation of said image, said scaled digital representation comprising Q digital values, Q being the product of P and a scaling factor L, said method comprising the steps of:

loading said digital representation into a processor comprising an array of at least M rows and N columns of processing elements so that each of said processing elements stores an associated loaded one of said P digital values as a stored value;

controlling each row of at least two pairs of rows of processing elements, paired rows being separated by S rows, S being related to L, to operate in parallel to cause each processing element in said each row to replace its associated loaded value as its stored value with the associated loaded digital value from a processing element in the same column at a preselected number of rows away, at least one row of each pair being one of said M rows; and controlling each column of at least two pairs of columns of processing elements, paired columns being separated by S columns, to operate in parallel to cause each processing element in said each column to replace its associated loaded value as its stored value with the associated loaded digital value from a processor in the same row at a preselected number of columns away, at least one column of each pair being one of said N columns.

8. A device for transforming a first representation of an information pattern made up of a plurality of picture elements into a second representation of the information pattern, the device comprising:

first means for parallel aggregation of selected ones of said plurality of picture elements into first aggregates, wherein each of said first aggregates includes a copy of more than one of said plurality of picture element; and second means for parallel aggregation of said first aggregates into second aggregates, wherein each second aggregate includes a copy of more than one of said first aggregates;

wherein said first and second means for parallel aggregation further comprise a parallel data processor having a plurality of substantially identical cells for processing digital data signals, said parallel data processor further comprising:

a controller for generating control signals in response to program instructions; and a plurality of substantially identical interconnected cells each including a full adder having two data input terminals, a carry input terminal, a sum output terminal, and a carry output terminal, and a plurality of memories connected to said full adder and said controller, the memories each being individually controllable to supply selected ones of a plurality-of predetermined data signals to the input terminals of said full adder in response to control signals from the controller, the memories being connected to the full adder and the controller such that both logical and arithmetic operations are performed by the full adder.

9. A device for transforming a first representation of an information pattern made up of a plurality of picture elements into a second representation of the information pattern, the device comprising:

first means for parallel aggregation of selected ones of said plurality of picture elements of said first representation into first aggregates, wherein each of said first aggregates includes a copy of more than one of said plurality of picture elements; and second means for parallel aggregation of said first aggregates into second aggregates, wherein each second aggregate includes a copy of more than one of said first aggregates;

wherein said first and second means for parallel aggregation further comprise a parallel data processor having a plurality of substantially identical cells for processing digital data signals, said parallel data processor further comprising:

a controller for generating control signals; and a plurality of identical cells, each of said identical cells being connected to at least one neighboring cell and responsive to said controller, and adapted to process data from said at least one neighboring cell in accordance with said control signals, said cell including a memory segmented into at least two blocks to be able to perform more than one read/write operation per clock cycle at the direction of said controller.

10. A device for transforming a first representation of an information pattern made up of a plurality of picture elements into a second representation of the information pattern, the device comprising:

first means for parallel aggregation of selected ones of said plurality of picture elements of said first representation into first aggregates, wherein each of said first aggregates includes a copy of more than one of said plurality of picture elements; and second means for parallel aggregation of said first aggregates into second aggregates, wherein each second aggregate includes a copy of more than one of said first aggregates;

wherein said first and second means for parallel aggregation further comprise a parallel data processor having a plurality of substantially identical cells for processing digital data signals, said parallel data processor further comprising:

a controller for generating control signals; and a plurality of identical cells, each of said identical cells being connected to at least one neighboring cell and responsive to said controller, and adapted to process data from said at least one neighboring cell in accordance with said control signals, said cell including a memory having at least two ports to be able to perform more than one read/write operation per clock cycle at the direction of said controller.

* * * * *